United States Patent [19]

Board et al.

[11] Patent Number: 5,852,793
[45] Date of Patent: Dec. 22, 1998

[54] METHOD AND APPARATUS FOR PREDICTIVE DIAGNOSIS OF MOVING MACHINE PARTS

[75] Inventors: David B. Board, Boca Raton; Harold Cates; Eric Rawlings, both of Orlando, all of Fla.

[73] Assignee: DME Corporation, Fort Lauderdale, Fla.

[21] Appl. No.: 800,812

[22] Filed: Feb. 18, 1997

[51] Int. Cl.$^6$ .................................................. G06F 19/00
[52] U.S. Cl. ........................... 702/56; 702/183; 73/570; 73/577
[58] Field of Search ..................... 364/550, 551.01; 73/488, 577, 584, 593; 702/56, 183

[56] References Cited

U.S. PATENT DOCUMENTS

| | | | |
|---|---|---|---|
| 5,005,142 | 4/1991 | Lipchak et al. | 364/550 |
| 5,115,671 | 5/1992 | Hicho | 73/488 |
| 5,210,704 | 5/1993 | Husseiny | 364/551.01 |
| 5,251,151 | 10/1993 | Demjanenko et al. | 364/550 |
| 5,365,787 | 11/1994 | Hernandez et al. | 73/660 |

*Primary Examiner*—James P. Trammell
*Assistant Examiner*—Matthew Smithers
*Attorney, Agent, or Firm*—Malin, Haley, DiMaggio & Crosby, P.A.

[57] ABSTRACT

For automatically predicting machine failure a transducer sensor, such as piezoelectric crystal, is applied to a machine for sensing machine motion and structure-borne sound, including vibration friction, and shock waves. The structure-borne sound and motion sensed is converted to electrical signals which are filtered to leave only the friction and shock waves, which waves are processed, as by detecting the envelope and integrating beneath the envelope, resulting in a measure of friction and shock wave energy, i.e., stress wave energy. This measure is computed and processed for producing fault progression displays for periodic and aperiodic damage. This is accomplished in a personal computer, menu-driven environment.

36 Claims, 22 Drawing Sheets

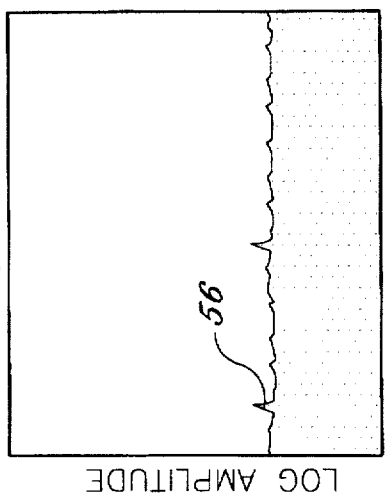
Fig. 6a
GOOD BEARING
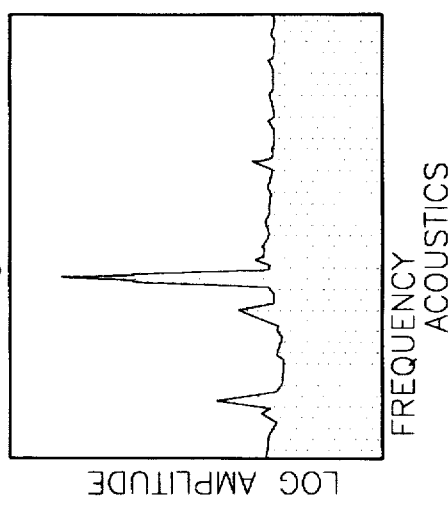
Fig. 6b
FREQUENCY
VIBRATION
(PRIOR ART)
Fig. 6c
FREQUENCY
ACOUSTICS
(PRIOR ART)
Fig. 6d
56
FREQUENCY
SWAN
(INSTANT INVENTION)
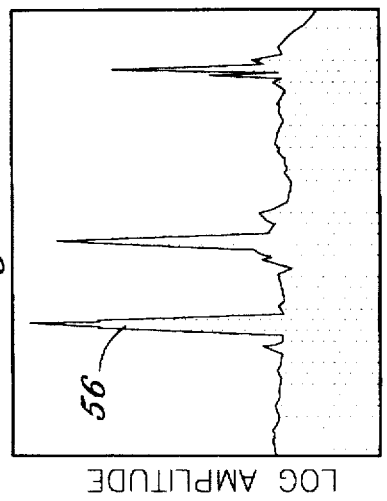
Fig. 6e
DAMAGED BEARING
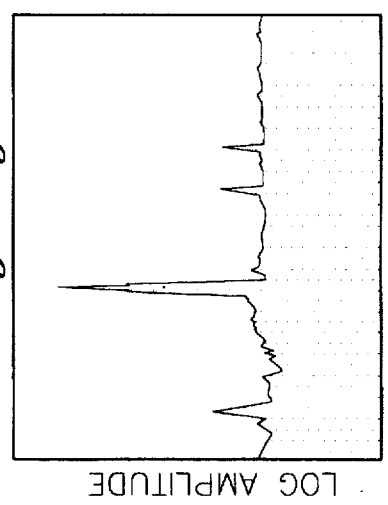
Fig. 6f
FREQUENCY
VIBRATION
(PRIOR ART)
Fig. 6g
FREQUENCY
ACOUSTICS
(PRIOR ART)
Fig. 6h
56
FREQUENCY
SWAN
(INSTANT INVENTION)

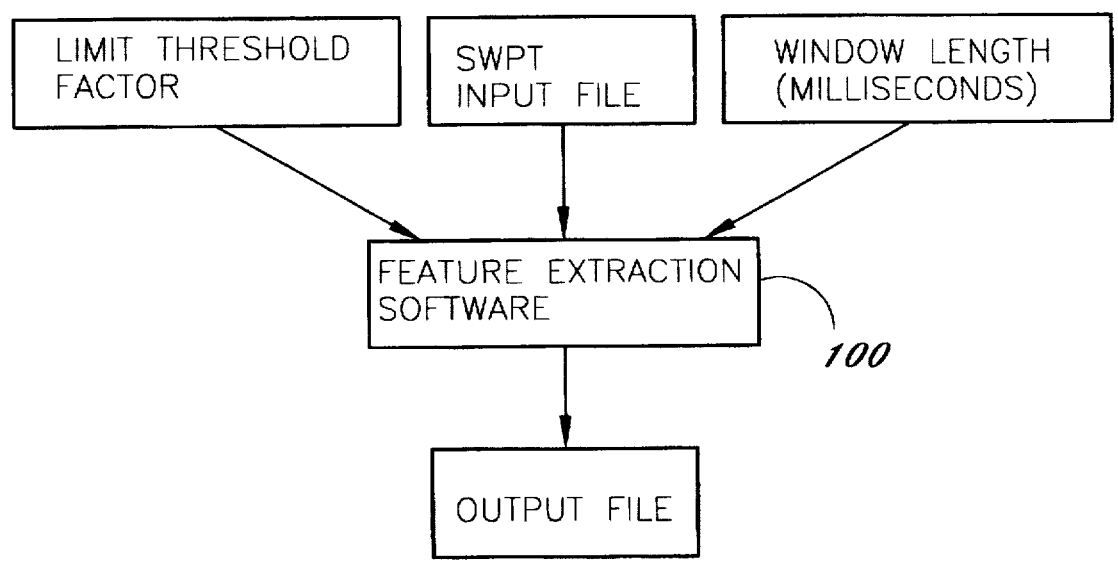
Fig. 14a(1)

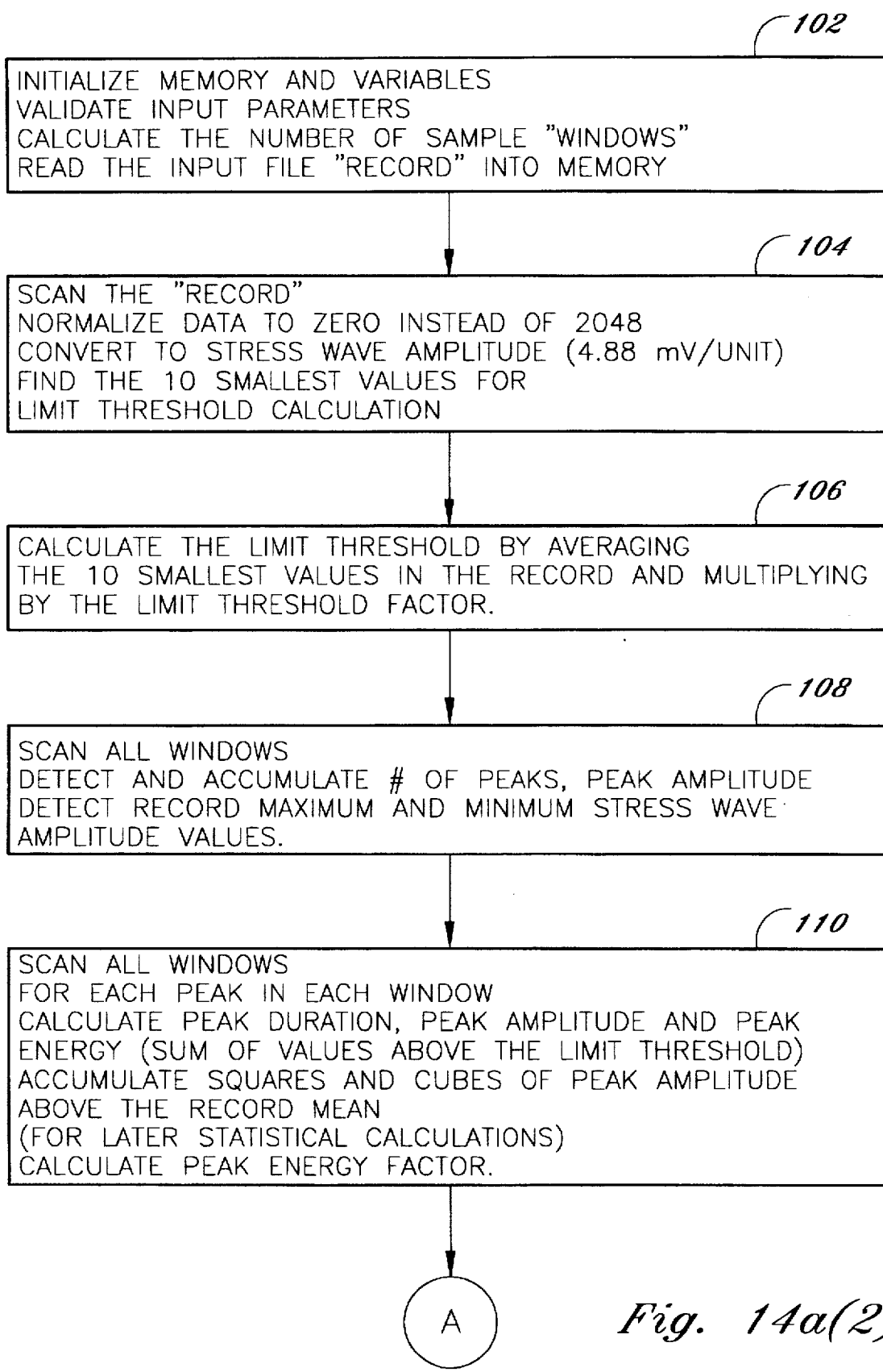
Fig. 14a(2)

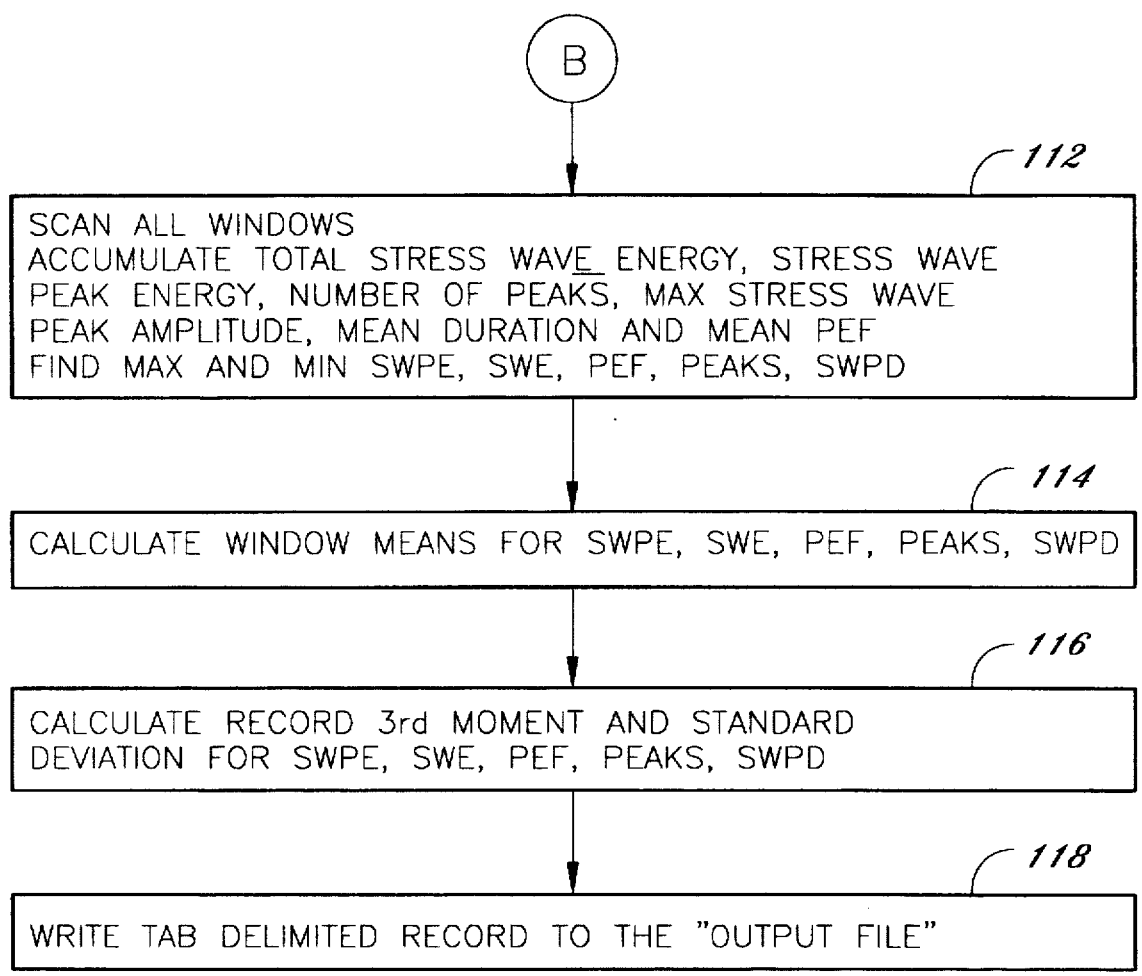
Fig. 14a(3)
Fig. 14a(4)

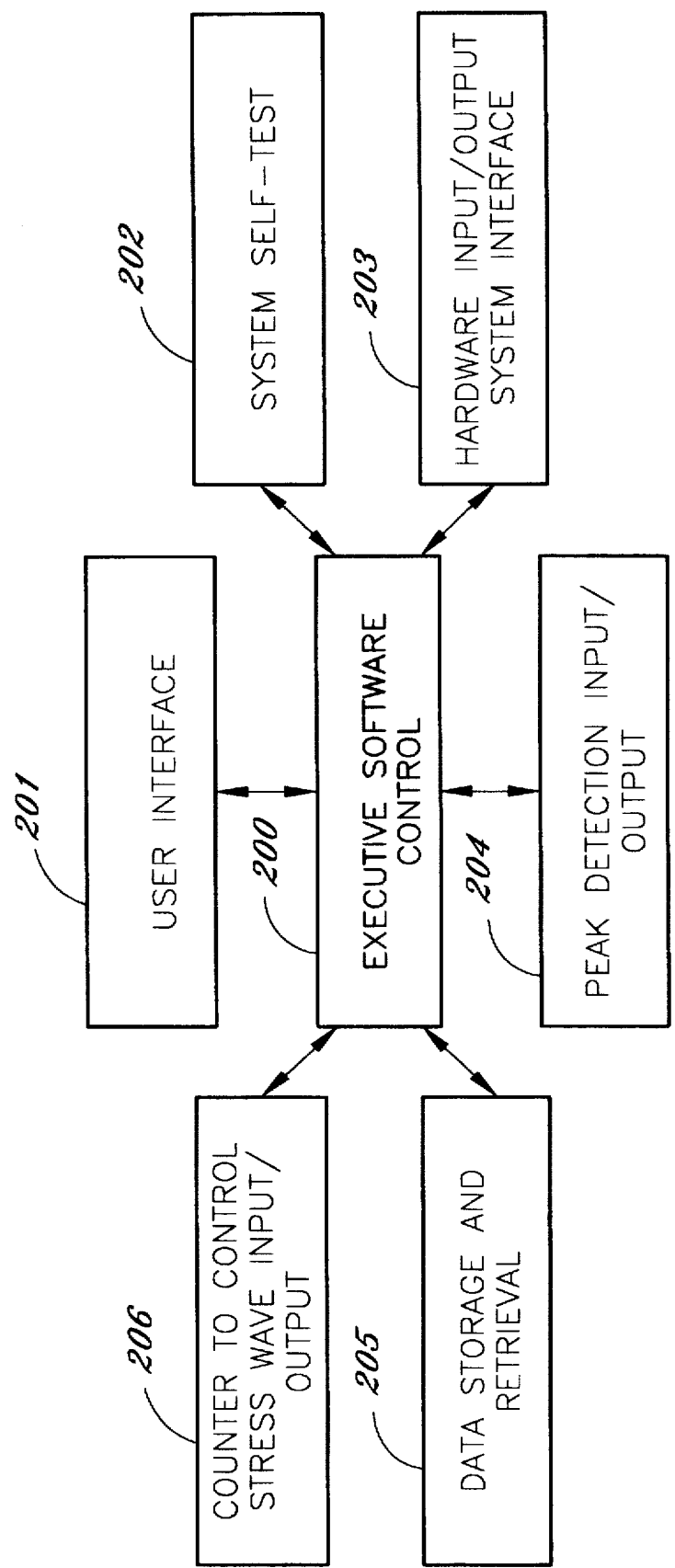
Fig. 14b(1)

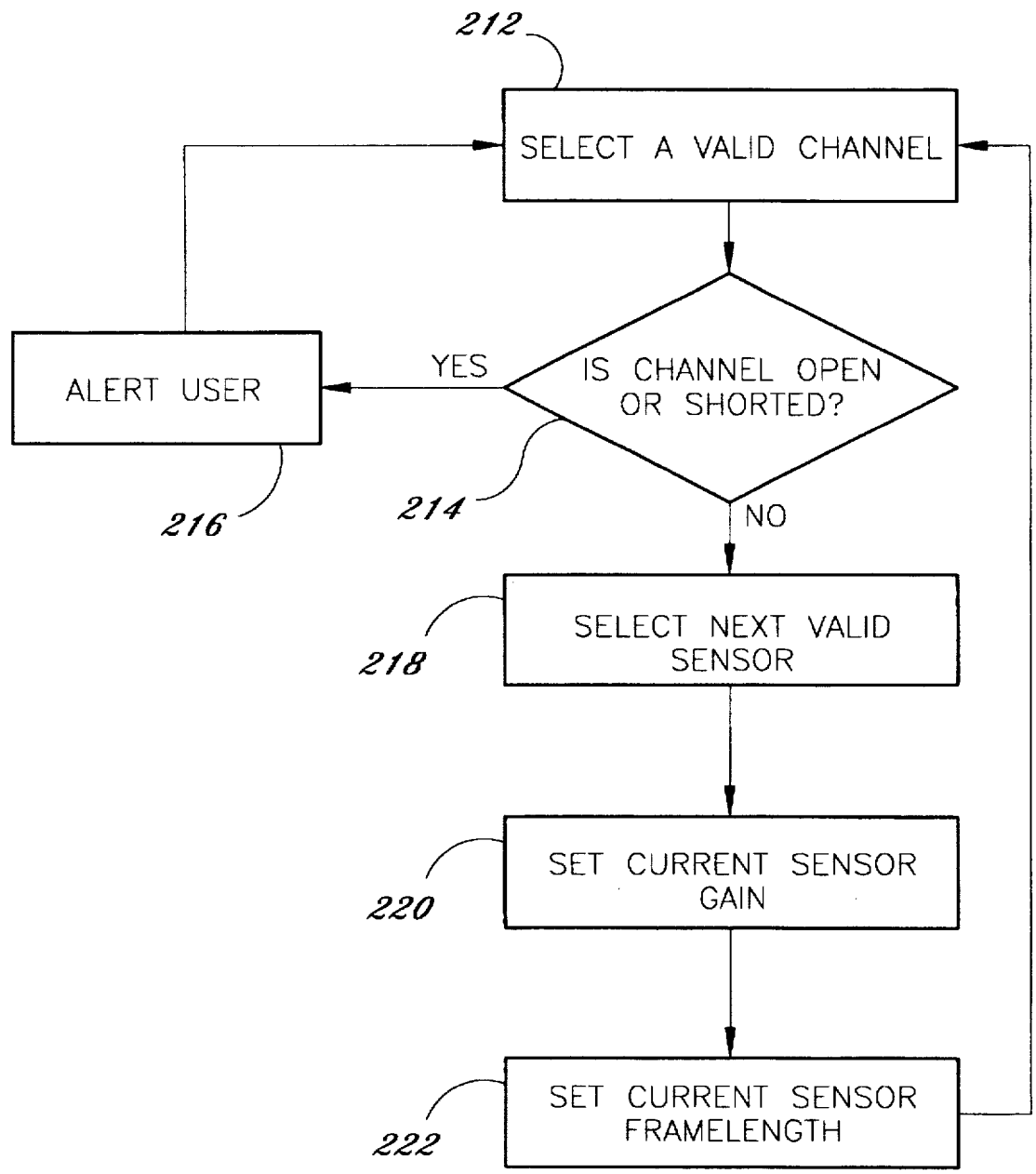
Fig. 14b(2)

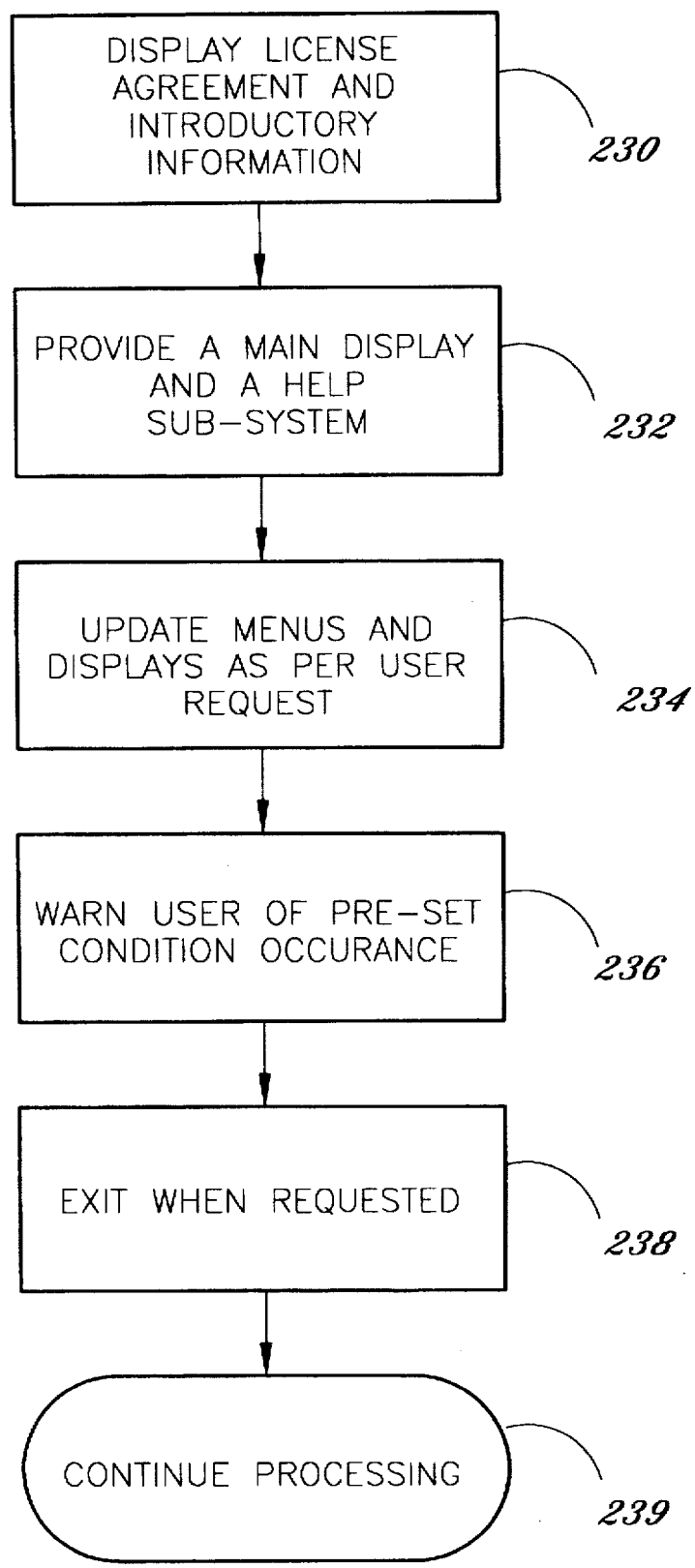
Fig. 14b(3)

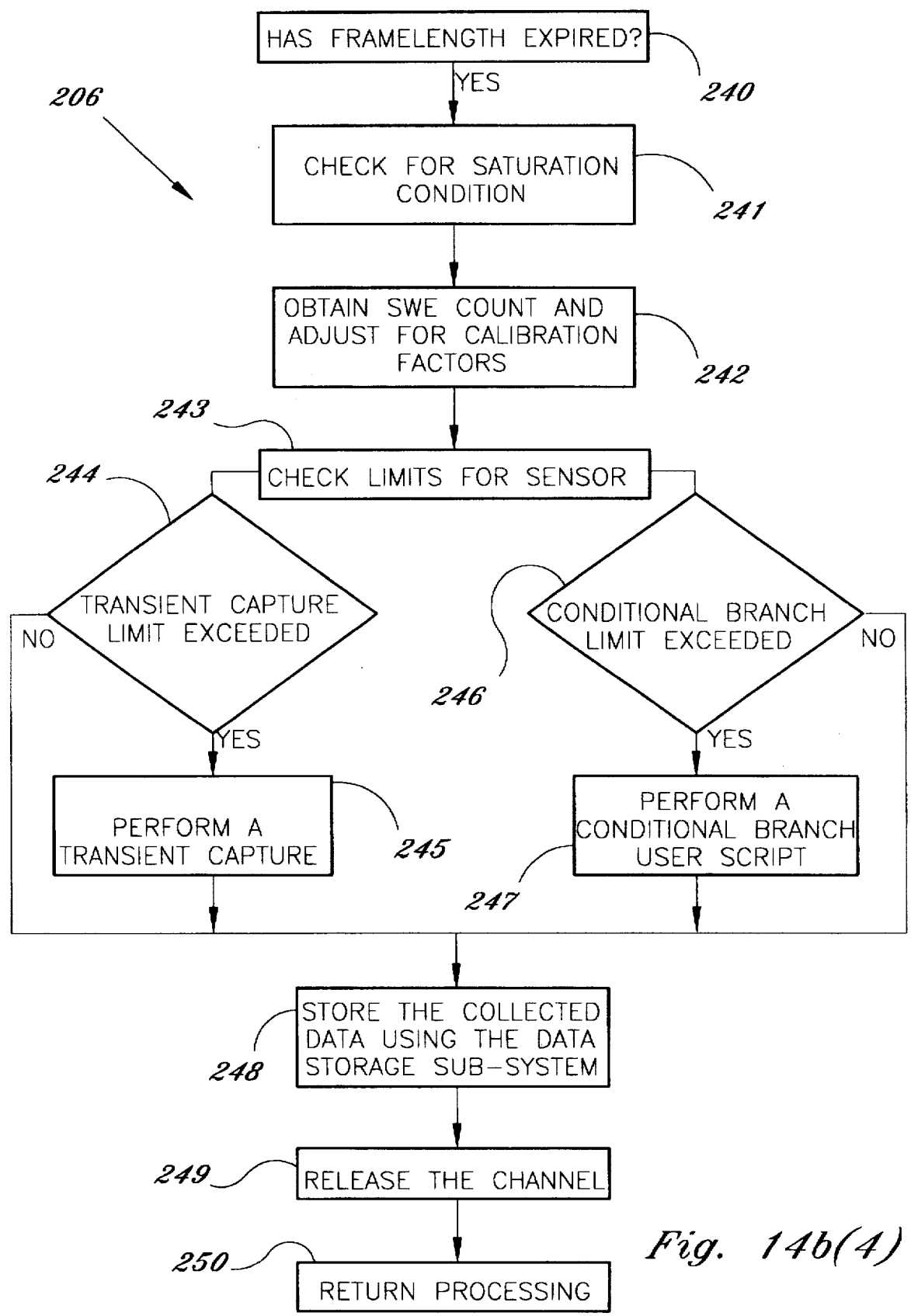
Fig. 14b(4)

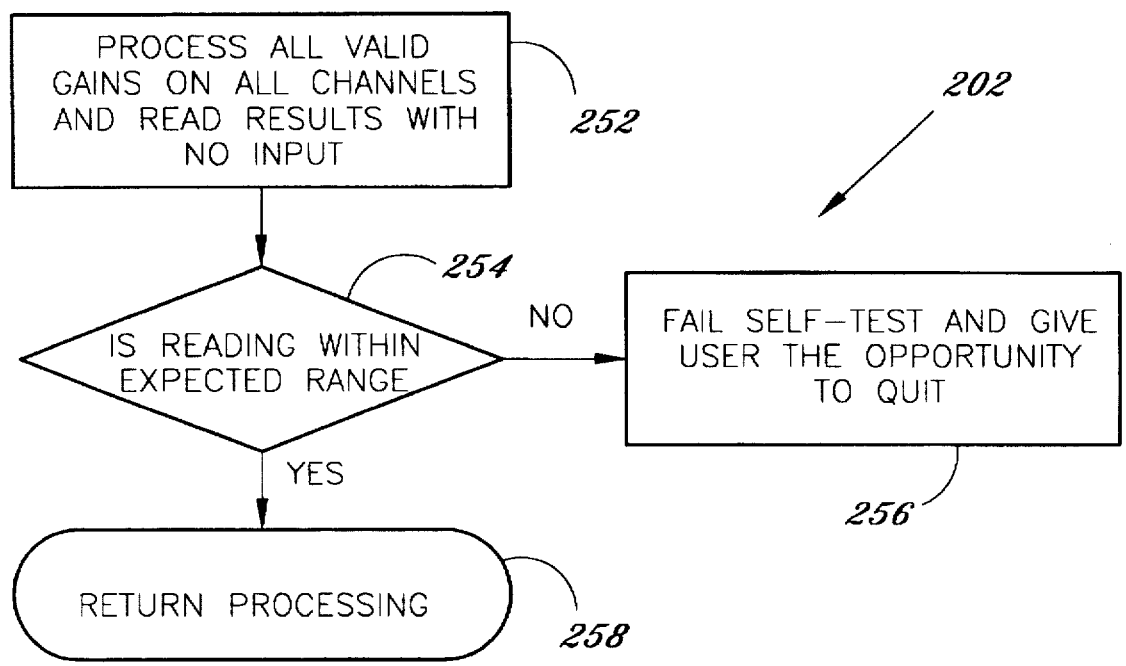
Fig. 14b(5)
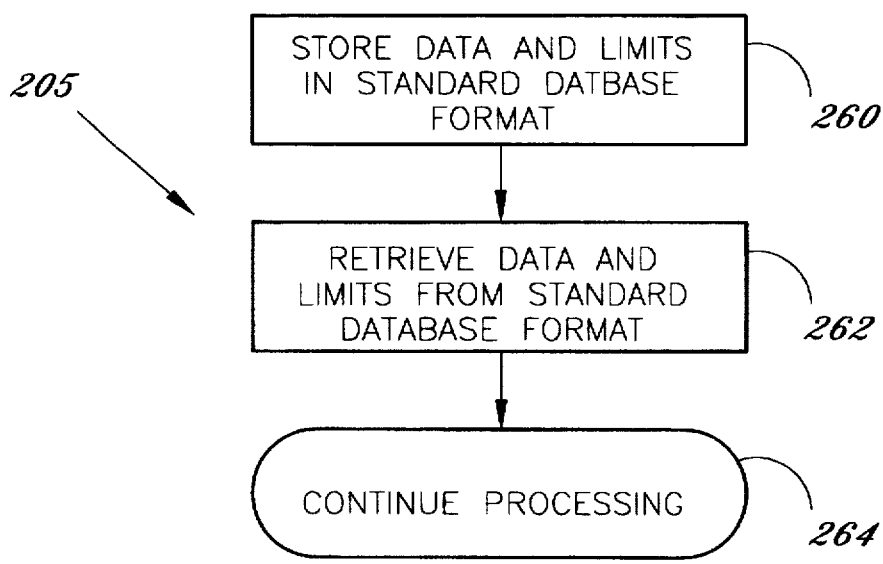
Fig. 14b(6)

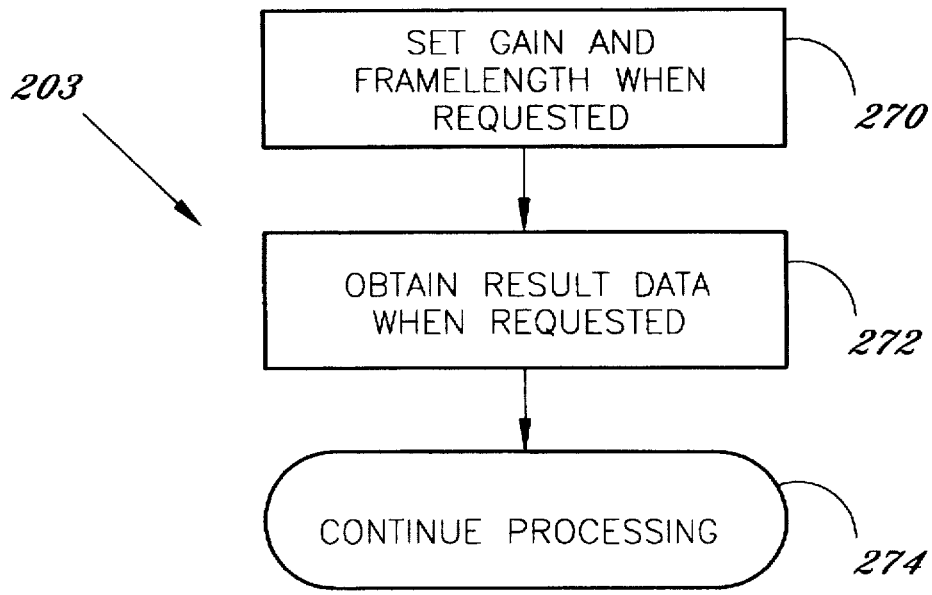
Fig. 14b(7)
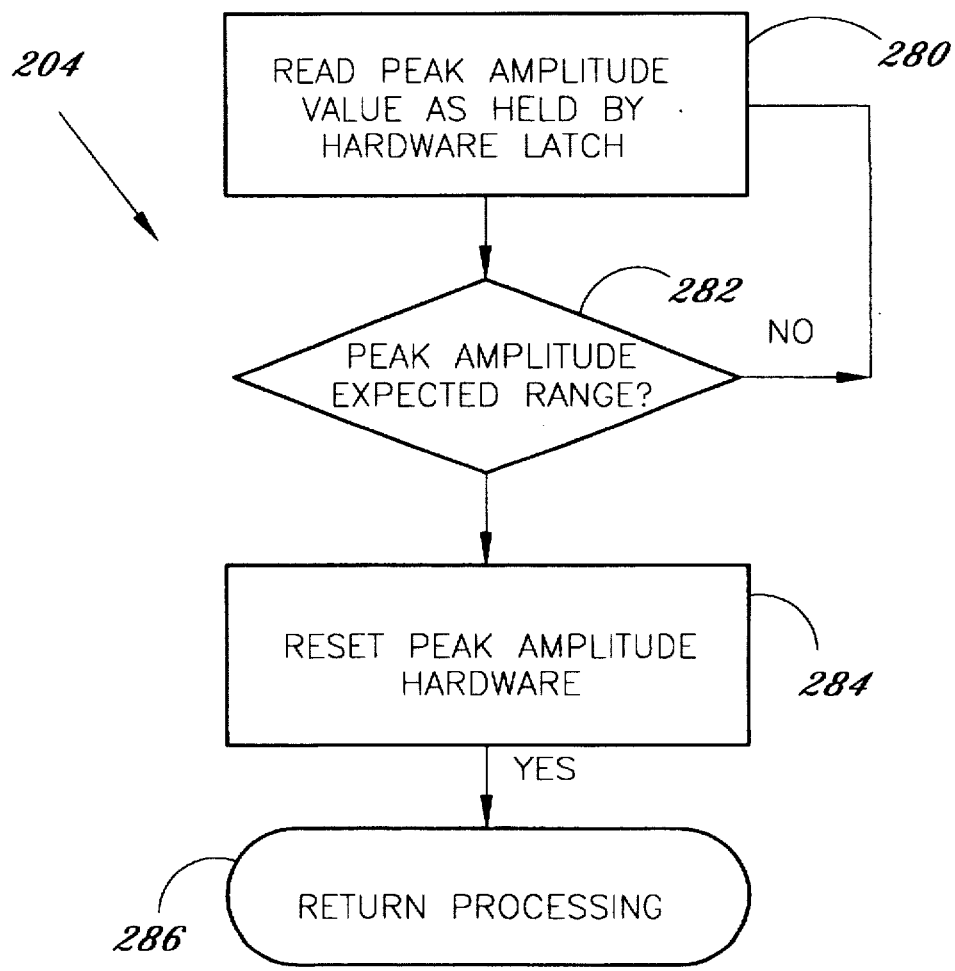
Fig. 14b(8)

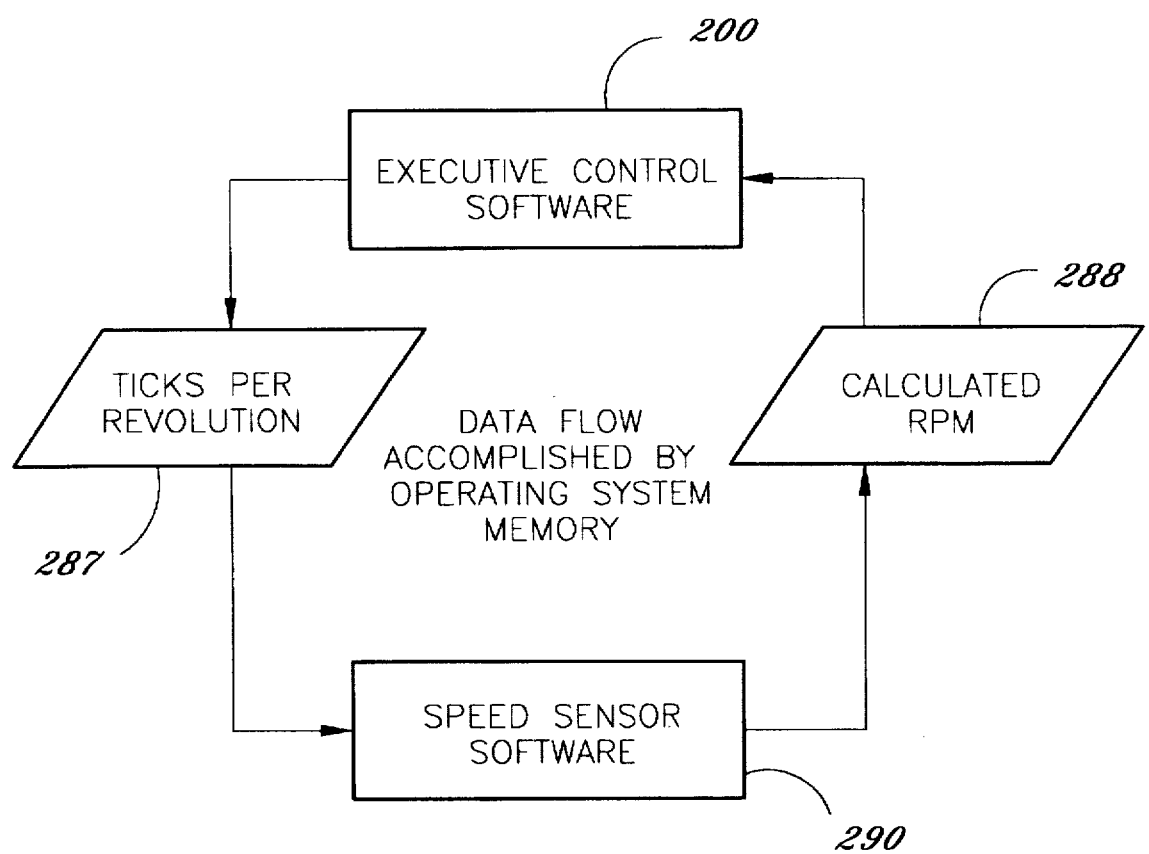
Fig. 14c(1)

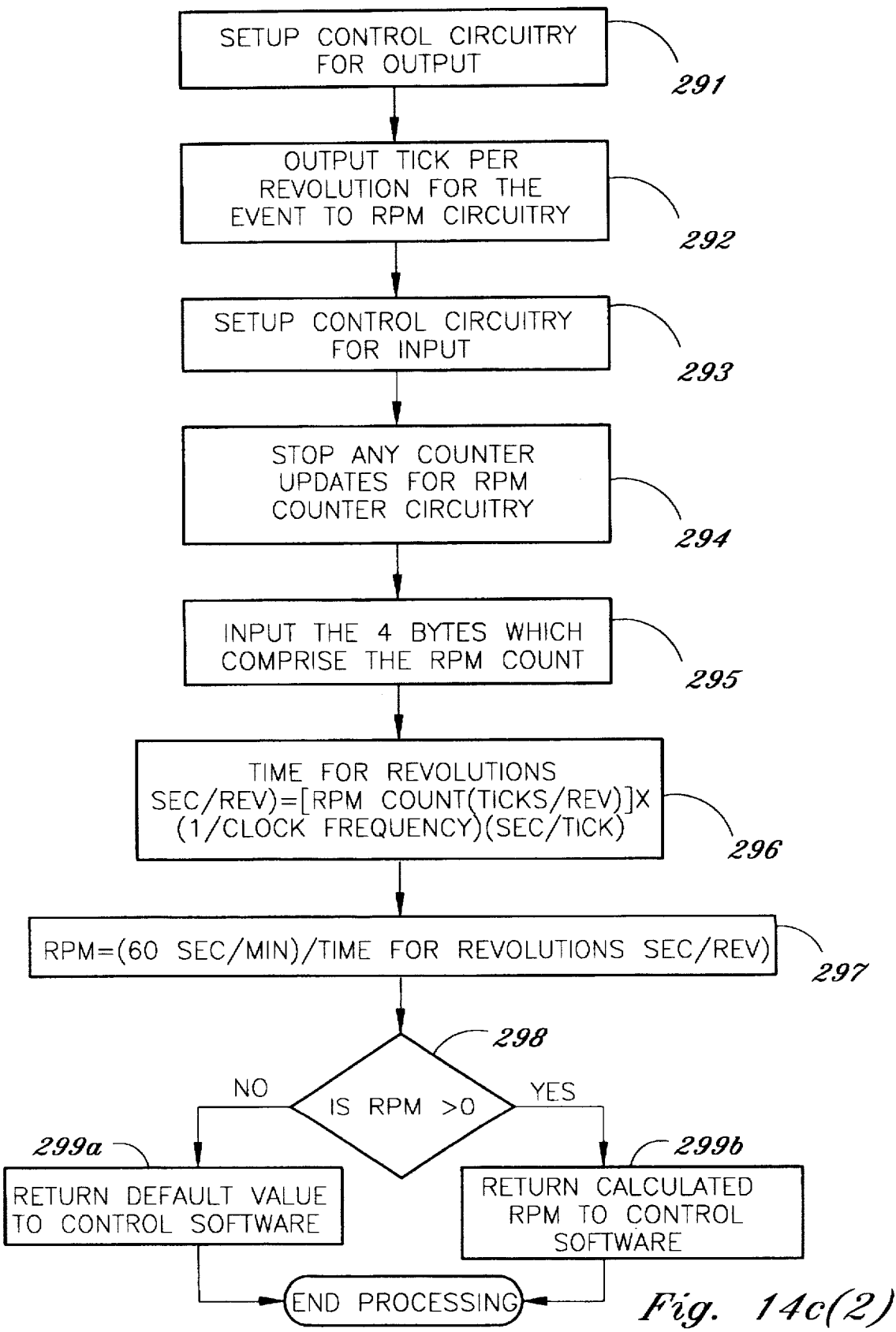
Fig. 14c(2)

METHOD AND APPARATUS FOR PREDICTIVE DIAGNOSIS OF MOVING MACHINE PARTS

BACKGROUND OF THE INVENTION

1. Field of the Invention

This invention relates generally to an improved system for predicting machine failure, and more particularly to an apparatus and system for real-time condition monitoring of rotating and reciprocating machinery to schedule maintenance so as to maximize machine operating life while reducing machine down time.

2. Description of the Prior Art

It is well known that rotating and reciprocating machinery require periodic diagnostic maintenance to detect machine part wear, predict failure, and locate problems. In modern machinery, such as marine machines, automatic transmissions, turboshaft engines, paper mills, rolling mills, aircraft engines, helicopter transmissions, and high-speed process machinery, failure of bearings or gears frequently result in costly productivity loss, severe and expensive secondary damage, and potentially life threatening situations. This is because over time, gear/bearing assemblies experience wear and damage, such as spalled bearing rolling elements, pitting on gear teeth, and bearing race damage. Regardless of when failures occur during a machine's life cycle, they start as small discrepancies and progress to larger ones that result in secondary damage, unacceptable operating conditions, or catastrophic failures. To ensure safety and avoid unscheduled interruptions, critical components are replaced at conservative fixed intervals based on periods of use. This practice significantly increases the costs of operation through wasted useful life of components, increased man-hours due to increased maintenance frequency and loss of productivity during maintenance shutdowns. Another common method for scheduling maintenance involves the analysis of used lubricant, but this is expensive, involves substantial time for processing, and may only indicate one of many failed parts. Thus, oil analysis lacks real time monitoring capability and provides little or no fault isolation.

Consequently, other diagnostic techniques, such as the use of vibration sensors, vibration analysis machines and metal chip detectors in lubrication systems, have become popular methods for indicating the need to schedule machine maintenance. The problem with vibration and metal chip monitoring and analysis, and similar traditional diagnostic techniques is that they do not provide a clear indication of problems until late in the failure process. Vibration analysis does not distinguish between system vibration and that resulting from small defects, since the former obscures the latter. Vibrational analysis also tends to cause false alarms, results in unnecessary maintenance, and masks defects prior to machine failure. As it is difficult and expensive to predict when machinery will fail, and traditional diagnostic techniques are incapable of providing a clear indication of problems until late in the failure process, there exists a need for a predictive diagnostic device or system that can accurately isolate failures prior to secondary damage without substantially interrupting operation. In addition, there exists a need for a predictive maintenance approach that reduces the premature, preventative replacement of non-damaged components.

To provide such a system, it is important to understand the dynamics of machine failure. With reference to FIG. 1a, failure rate is a function of operating time. The probability of failure is higher during the initial hours of a machine operation, or infancy stage (1), but quickly decreases to a constant rate during a machine's main operational life. Machine failure and damage during infancy may result from improper assembly, installation error, improper run-in, and rough shipping and handling. Traditional diagnostic techniques are typically incapable of detecting infant mortality in stage (1). Monitoring equipment early in its life cycle can avoid unforeseen failures so that corrective action may be taken during acceptance testing. During stages (2) and (3), as shown in FIG. 1a, a machine's probability of failure is constant, but relatively low. Since failures can still occur, stages (2) and (3) represent a period of random failure. During the early stages of the failure process, conventional techniques are incapable of accurately detecting problems leading up to random failures. Notwithstanding, the main problem for traditional diagnostic techniques is that for many critical pieces of rotating or reciprocating machinery, the time at which the probability of wear out failure begins, stage (4), is not known or easily ascertainable. Thus, operating time and cycle limits are conservatively estimated such that overhaul of the equipment is done prematurely, prior to wear out. To avoid failure and operation interruption, good components are replaced during stage (3) long before the machinery enters the wear out stage (4), in an effort to prevent increasing rates of unforeseen critical equipment failure. Parts removed based on conservative replacement limits often have a remaining useful life of two or three times the replacement life.

The time at which a machine enters the wear out phase of its life cycle is a function of its inherent design reliability and its operational history. Thus, different individual machines in a population of identical machines may begin to wear out at different times. Consequently, the time between overhauls (TBO) varies between machines. The ability to accurately predict the time when wear out begins would allow the TBO to be safely extended. Extending service life results in reduced down-time for equipment replacement/ overhaul and reduced overhaul induced failure rates. Moreover, the ability to accurately predict maintenance would allow every machine to be operated for as long as its failure rate could be maintained at acceptable levels of preventative maintenance and minor repairs. The predictive maintenance is especially important as a machine enters into the final stage (4) of its life cycle to provide advanced notice of impending failure.

The inventor herein, addressed some of the concerns noted above in U.S. Pat. No. 4,530,240, issued to Board et al., which is incorporated herein by reference. Board et al. teaches an apparatus for predicting machine failure. The apparatus generally comprises a piezoelectric crystal transducer and a case containing a series of filter and amplifier stages, a bandpass filter, a precision rectifier and filter, a voltage-to-frequency converter, a counter and sequencer, and a signal level detector. The crystal transducer physically attaches to the machine. When a machine has defects, friction and shock events produce recognizable and readable stress waves (structure borne ultrasound) that are detected by the transducer as machine parts penetrate their lubricant boundary layer and come in contact with one another. The transducer converts the stress waves in the machinery into electrical signals which are conditioned by the series of filter and amplifier stages, and further by the bandpass filter to leave only the friction and shock wave signals. The signal level detector indicates the peak amplitude of the signal level. The precision rectifier and filter cleans up the signal into a typical rectified envelope wave form which is applied to the voltage-to-frequency converter, the output of which is integrated under the envelope by the counter and sequencer for a resultant stress wave energy level. Once a stress wave energy reading is obtained, it can be manually compared to earlier readings to determine whether damage has occurred in the machine.

Background devices and techniques known are not able to measure stress wave energy and are therefore hampered by natural machine vibrations. By isolating friction and shock signals from the natural vibration frequencies of the machine, Board et. al. is able to convert the signal to a stress wave reading and, hence, address some of the problems associated with prior art techniques, such as masking damage until late in the failure process. Board et. al., however, is limited to a single input, instantaneous, manual measurements and manual trend analysis. While the ability to measure stress wave energy provides a reliable indicator for predicting machine failure, the ability to more fully and automatically take readings and extract information from a stress wave energy quantitative measurement and trend would enhance predictive and preventative diagnosis of machinery. In equipment where heavy maintenance results from friction, mechanical wear and tear, poor lubrication, or component failure, stress wave analysis provides a simple, effective, and quantitative means of detecting that failure. Prior art techniques are not able to perform stress wave analysis. The instant invention, however, automatically detects failures in their infancy so as to use less costly interventions that, over time, present a lower cost maintenance approach.

With reference to FIG. 1b, a measure of stress wave energy during the failure process over operating time is shown. The stress wave energy plot is shown with bearing damage level over a period of operating time to illustrate failure progression and defect detection using stress wave energy analysis. A quantitative and trendable measure of machine condition throughout failure progression is shown with initial damage occurring at point (a) and catastrophic failure occurring at point (g). Prior art techniques do not detect damage or failure until point (i), after significant damage has already occurred. By contrast, the instant invention detects damage at point (b).

With recent advancements in computer hardware and software technology, stress wave analysis would be well received if it was automated and able to provide continuous, reliable condition monitoring of machinery to identify machine defects at early stages, monitor progression of defects, and offer user defined customization. The instant invention addresses these needs by offering a unique stress wave analysis computer based system having features such as continuous monitoring, real-time custom monitoring, data processing, status indicators and programmable alarm conditions.

SUMMARY OF THE INVENTION

It is an important object of the present invention to provide a method and apparatus for accurately predicting need for maintenance in rotary equipment, for example equipment including gears and bearings.

It is another object of the present invention to provide a method and apparatus for detecting damage or defects in machines, which requires relatively little defect generated energy and can detect relatively small defects, minimizes the possibility of both false alarms and undetected failures, while indicating with relatively high accuracy the defective part or parts.

It is another object of the present invention to provide machine fault detection immediately, as well as affording a profile of fault progression, all without parts removal or shutdown.

Still another object of the present invention resides in the provision of a method and apparatus for testing machinery to assure its compliance with specifications and in settling warranty claims.

It is a preferred object of the present invention to provide an apparatus and system capable of continuously monitoring rotating and reciprocating machinery for defects, failures, and damage, and for accurately predicting the need for maintenance of the machinery.

It is another object of the present invention to provide an apparatus and system for detecting damage or defects in machinery which is able to distinguish between natural machine vibration and friction and shock waves resulting from minor and major defects.

It is also an object of the present invention to provide an apparatus and system which continuously monitors machinery for damage and minimizes the possibility of false alarms, undetected failures, and premature overhaul maintenance.

It is a further object of the present invention to provide an apparatus and system which accurately predicts when machinery enters the wear out stage so as to maximize a machine's operating life while eliminating premature maintenance, maximizing useful life of components, decreasing man-hours spent on maintenance, and increasing productivity by reducing maintenance shutdowns.

It is yet another object of the present invention to provide an apparatus and system that continuously monitors machines for defects without parts removal or shutdown.

It is yet an additional object of the instant invention to provide an apparatus and machine which creates a profile of fault progression, automatic data storage, and processing for extraction by the cognizant users.

It is yet a further object of the instant invention to provide an apparatus and machine for continuously monitoring the machinery for defects and having user-defined condition alarms for ascertaining when maintenance should be done.

It is still another object of the instant invention to provide an apparatus and system for continuously monitoring machinery for defects having manual operator controls capable of bypassing automatic controls.

It is still an additional object of the instant invention to provide an apparatus and system for real-time custom monitoring of machinery, including transient capture and analysis modes for diagnosing machine damage.

It is still a further object of the instant invention to provide an apparatus and system for continuous monitoring of machinery having a user-friendly operating system and software.

It is yet a further object of the instant invention to provide an apparatus and system for the continuous monitoring of machinery having remote control status output capabilities.

In light of these and other objects, the instant invention generally comprises a computer-based system having user-friendly, menu-based software for adapting the system to custom monitoring of virtually any rotary machinery, automatic sensor scanning through selected points on the machinery, data processing and storing, fault progression analysis, and user-defined condition alarms to indicate when selected sensors have a stress wave energy reading exceeding a predetermined threshold. These objects are generally achieved with a plurality of piezoelectric crystal transducers attached to selected points on the machinery, an analog signal conditioner, digital processor, user controls and display operation. The analog signal conditioner receives sensor inputs selected by an analog multiplexer, amplifies and filters the input signals through a high-frequency bandpass filter, detects envelopes in a demodulator circuit, the output of which is provided to the digital processor which undergoes analog-to-digital conversion, stress wave energy computation, and control and display logic. It is within the digital processor that user-defined condition alarms may be triggered, data storage and processing effected, and automatic sensor scanning is achieved. The stress wave energy readings obtained are displayed on a user-viewable monitor in a format selected by the user. The user controls the display via a menu-based software and is able to select, among other options, automatic sensor scanning, select sensor monitoring, alarm conditions at operator adjustable thresholds, failure progression updates, and remote control status outputs. To achieve the foregoing, the instant invention includes a personal computer for effecting digital processing of conditioned analog signals. The multiplexer receives sensor inputs directly from the piezoelectric crystal transducers and selects the signals to be transmitted to the analog signal conditioner based on digital inputs from the computer processor.

The instant invention provides a computer system for diagnostic real-time condition monitoring of rotating and reciprocating machinery. The system detects early stages of machine damage and wear and alerts personnel of the extent of that damage. The computer system is typically installed for continuous monitoring of critical operations but can be used as a survey tool for analysis of downloaded data. The goal, in either mode, is to achieve maximum machine operating life in an efficient, economical, and safe manner. The system detects and displays a machine's condition by using structure borne ultrasound (stress waves) to measure the energy created by shock and friction events occurring within the machine. For example, if the lubricant becomes contaminated, the system detects the early signs of the contamination. If a bearing or gear develops surface fatigue damage, the system detects and displays early signs of the problem. Even when slight damage or wear occurs, such as minor pitting or spalling, the measurable stress wave energy differs from the energy produced by a healthy machine. This trendable change in stress wave energy is compared to readings on healthy machines which form the basis for a sound predictive maintenance program.

A quantitative and trendable measure of machine condition for bearing damage throughout failure progression is shown in FIG. 1b. With reference to FIG. 1b, the instant invention produces a detectable stress wave energy point (b) shortly after initial damage (a), such as pitting. Subsequent damage produces higher signal levels of friction and shock and, hence, higher stress wave energy levels. For instance, the first spall flakes in bearing damage occur at point (c), deeper spalling and oil debris occur at points (d) and (h), increasing spall areas and noise/vibration occur at points (e) and (i), increased temperatures are found at point (j), and smoke is seen at point (k). In the typical bearing defect progression as shown, massive cage damage and catastrophic failures occur at points (f) and (g), respectively, and produce the highest stress wave energy levels. The instant invention begins detecting stress wave energy produced by friction and shock waves at a point (b) early in the failure progression and can trigger condition alarms once the stress wave energy exceeds operator selected thresholds. By contrast, prior art diagnostic techniques do not detect the damage until the damage produces detectable vibration at point (i) late in the failure process, as shown in FIG. 1b. The computer automated Stress Wave Analysis (SWAN™) system is able to monitor and provide a quantitative, trendable measure of machine condition stress waves throughout failure progression, unlike conventional systems. In most instances, secondary damage occurs prior to detection by traditional diagnostic techniques.

Operating under a user-friendly, menu-based environment, the computer automated SWAN™ system of the instant invention runs operation and display software that can be tailored to monitor a broad range of rotating and reciprocating machine applications. Since no two machines are alike, the flexibility of the computerized system allows operators to customize their systems to achieve the most efficient and economical maintenance program for their equipment. For instance, the system of the instant invention can monitor and take stress wave readings of low speed machinery, such as rolling mill gear boxes (having pinion speeds between 14 and 175 rpm), and indicates race and tooth damage on the gears before secondary damage occurs. Meanwhile, previous diagnostic efforts using vibration measurements have been unsuccessful since the low speed and high mass of the machine resulted in extremely low level housing motion/vibration. The instant invention can also detect advance levels of damage, such as cracks in shrink-fitted inner races on paper mill roller bearings, while other techniques, including vibration spectrum analysis, have proven to be incapable of detecting similar advanced levels of damage. As replacement bearings are not always available, good and failing bearings must be distinguished by identifying those with through-the-part inner race cracks as opposed to pitting or spalling, and of those which have progressed to serious levels of damage through stick-slip machining of the bearing journal. To accomplish these advanced tasks (fault detection, failure mode definition, and damage quantification), the instant invention is able to analyze a stress wave pulse train and stress wave energy, perform spectral analysis to identify bearings with friction and shock events occurring at the rolling element passage frequency for a point on the inner race and record a time history to identify bearings with high amplitude and aperiodic stress wave pulses. The instant invention can also perform predictive maintenance on machinery such as automatic transmissions and turbo shaft engine bearings to detect damaged planet bearing assemblies having moderately spalled rolling elements, races, and gear teeth. Other examples of predictive maintenance solutions for rotating and reciprocating machinery include marine machinery bearings, axial fan blower bearings, and electric motor bearings.

Since reliable condition monitoring requires maintenance personnel to be able to identify machine defects at early stages and be able to monitor the progression of the defect, the instant invention provides a computer-based system that measures shock and friction waves, computes a stress wave energy (SWE™) level, and triggers alarms if that level exceeds predetermined thresholds. These quantitative measures are taken at early stages in the fault cycle. At its earliest stages, a defect will not cause any significant loss in machine operating efficiency, but is still detectable by the invention. Through continued operation, the defect will increase and become a potential source of secondary damage. As machine parts come in contact with the defect, even at the earliest stages, shock and friction events generate ultrasound or stress wave energy. Stress wave analysis detects and measures this energy at wear and damage levels well below the levels required to excite prior art vibration sensors, and before sufficient damage has occurred to activate metal chip detectors in lubrication systems.

Stress waves, transmitted through the machine's structure, are detected by a sensor mounted firmly on the structure. A piezoelectric crystal in the sensor converts the stress wave energy into an electrical analog signal. This signal is then amplified and filtered by a high frequency bandpass filter in the analog signal conditioner to remove unwanted low frequency sound and vibration energy. The output of the signal conditioner is a stress wave pulse train that represents a time history of individual shock and friction events in the machine. The stress wave pulse train is then analyzed by the digital processor to determine the peak level of the stress wave energy and the total energy content generated by the shock event. The stress wave energy is ascertained by integrating stress wave envelopes. The computed stress wave energy is displayed on the system's control panel or monitor and can be recorded for comparison with other stress wave energy readings. The most useful data is obtained when initial stress wave energy readings are taken with no discrepancies in the machinery, to establish a baseline stress wave energy pattern. Deviations from the baseline pattern indicate a stressed operating condition that should be monitored. The invention measures even slight shock and friction events that occur between contact surfaces in rotating and reciprocating machinery. The level and pattern of anomalous shock events become a diagnostic tool.

In accordance with these and other objects which will become apparent hereinafter, the instant invention will now be described with particular reference to the accompanying drawings.

BRIEF DESCRIPTION OF THE DRAWINGS

FIG. 6 is a graphical illustration contrasting prior art diagnostic systems with the instant invention for a good bearing and a damaged bearing.

FIGS. 14a(1)–14a(4), 14b(1)–14b(8), 14c(1)–14c(4) are flow diagrams of the Stress Wave Pulse Train feature extraction software for providing meaningful quantitative condition indicators for use with third-party expert system and/or neural network software, and the program manager which comprises operational control software for receiving and processing stress wave related signals.

DESCRIPTION OF THE PREFERRED EMBODIMENTS

With reference to the drawings, FIGS. 2–14c(2) depict the preferred embodiment of the instant invention which comprises an apparatus or system 10 for predictive diagnosis of moving machine parts to assist engineers in detecting failures and scheduling timely maintenance. The instant invention 10 represents a vast improvement over the prior art whereby it uses a computer, processor or other intelligent system capable of reading and processing instruction code to monitor stress wave energy in any machine having moving parts. In addition, the instant invention is able to read and process a plurality of stress wave energy (SWE™) in parts, unlike the background systems. The instant invention is intended to be flexible and virtually independent of any intended operating environment and PC platform.

Figure 2:
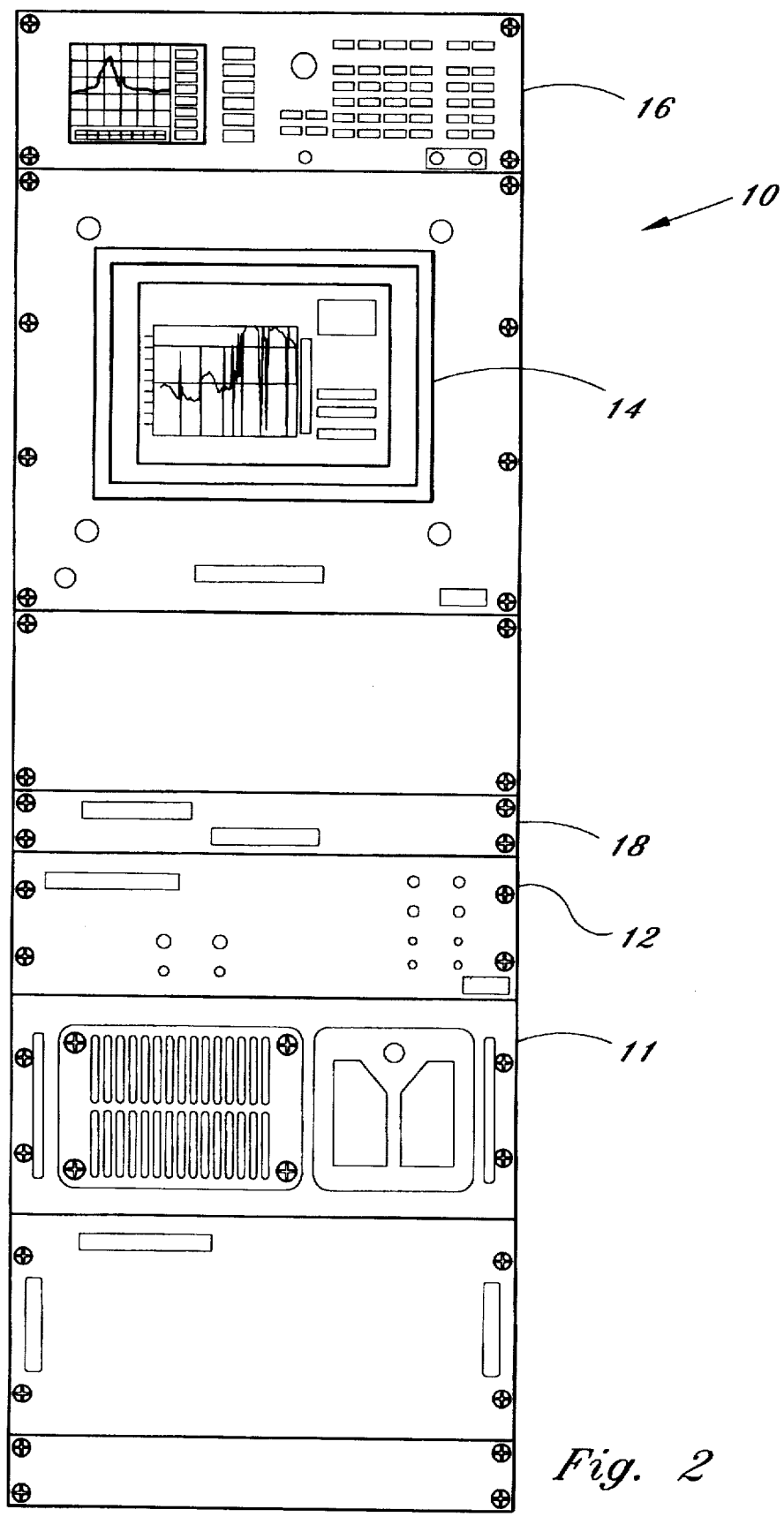
FIG. 2 is a front elevational view of the rackmounted system version of the instant invention illustrating user interface components.
Figure 3:
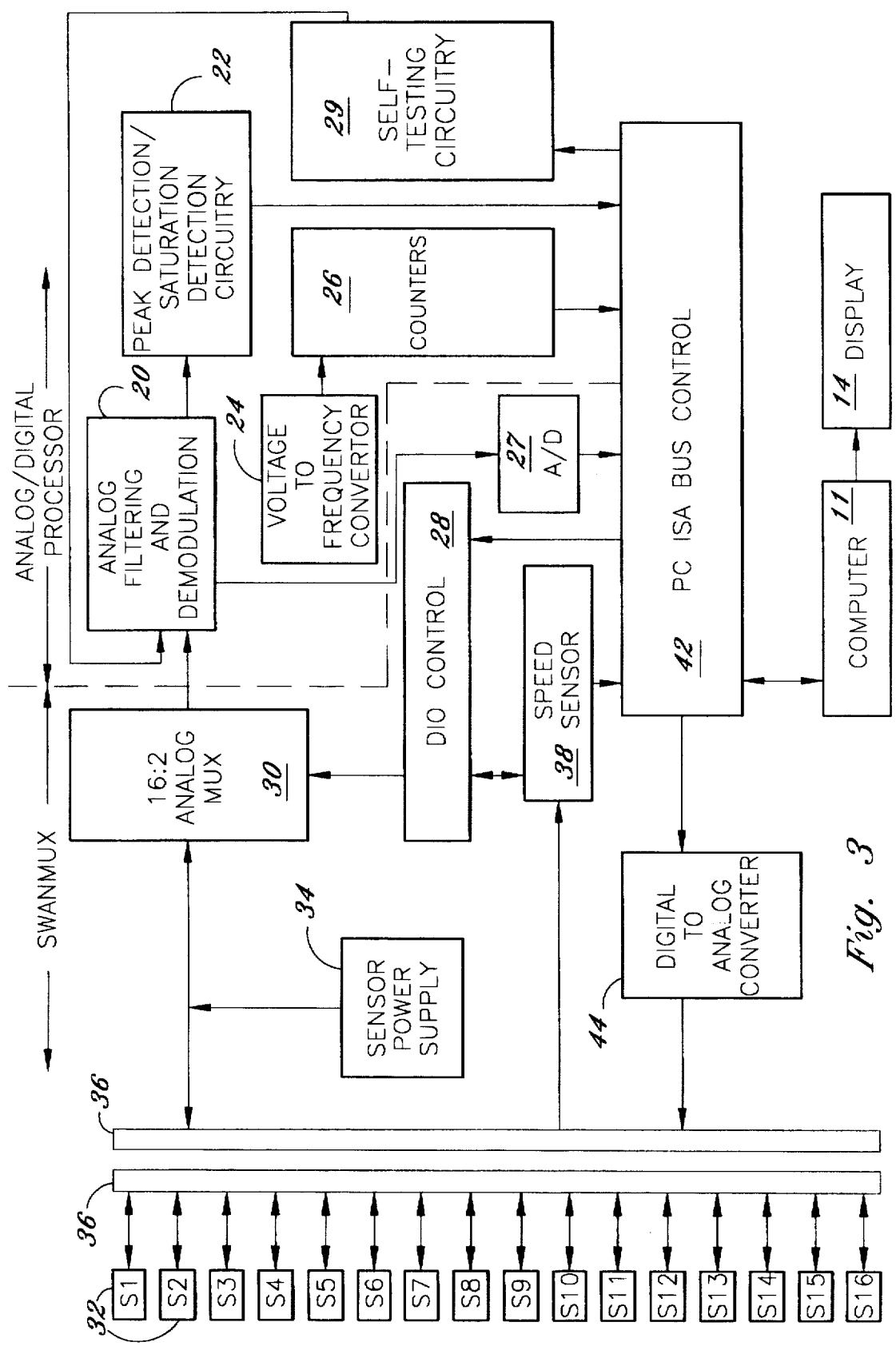
FIG. 3 is a detailed block diagram of the instant invention illustrating the multiplexer, analog signal conditioner, digital processor, and industry standard personal computer hardware.
Figure 4:
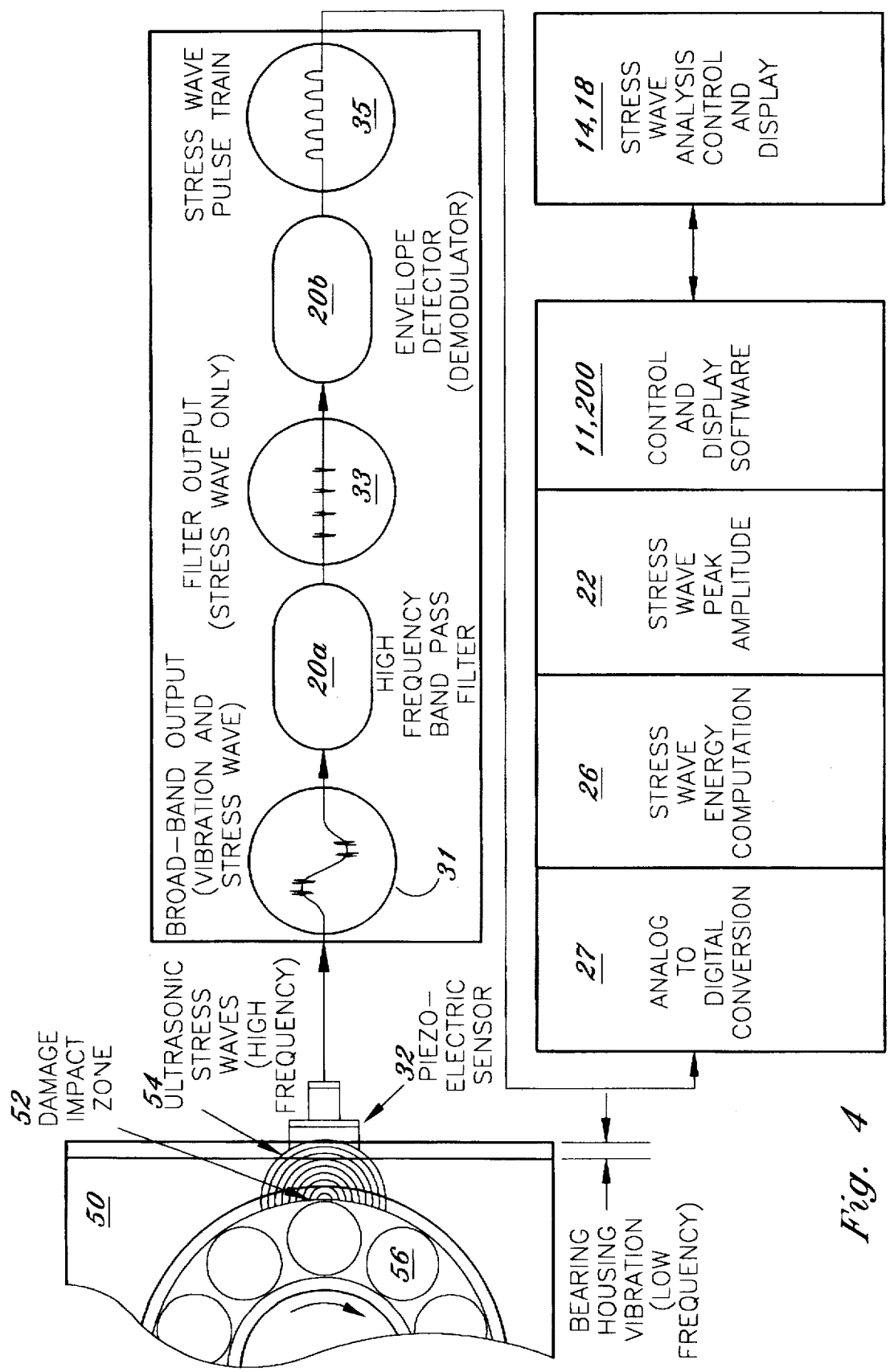
FIG. 4 is a block diagram of the instant invention illustrating the analog signal conditioner, digital processor, and personal computer instrumentation, and the filtering of analogical stress wave signal passing therethrough for measuring structure-borne sound associated with friction and shock events and providing a quantitative indication of equipment wear or damage.
Figure 5A:
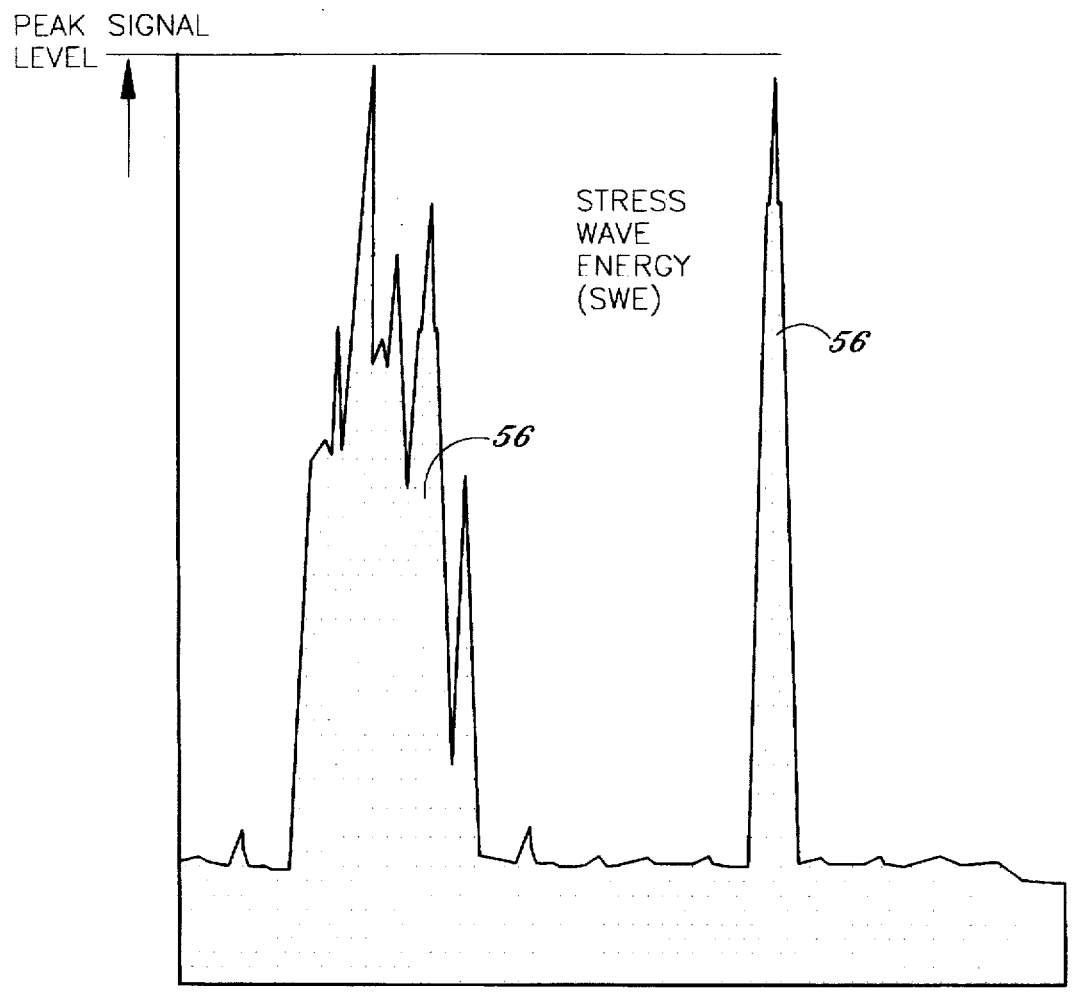
FIG. 5 is a graphical illustration of stress wave pulse amplitude and energy content for stress wave pulse train as produced by the damage zones for the race profile shown.
Figure 5B:
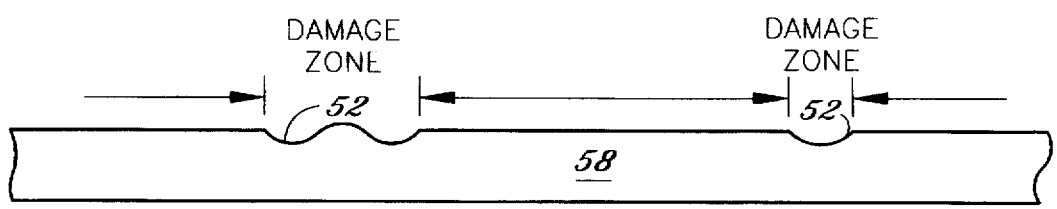

A representative system 10 is shown in FIG. 2, which includes a personal computer (control processor) 11, FFT spectrum analyzer 16, monitor 14, keyboard 18, and an external interface assembly 12 for connecting external instrumentation, such as oscilloscopes, and selecting outputs (including stress wave pulse trains (SWPT™), external triggers (TTL, analog, analog ICP), vibration and transient capture playbacks). Referring to FIGS. 3 and 4, the instant invention is generally referenced by the term "system" 10, and generally comprises a means for receiving a plurality of signals from a plurality of shock and friction sensors 32 (stress wave sensors), an analog signal conditioner 20, a digital processor 22, 24, 26, 29, a control processor 11 and program code which is readable by the processor 11. The program code comprises a program manager 200 and feature extraction software 100.

The control processor 11 is operational with a display 14 and user interface 18. The control processor comprises a personal computer having industrial applications for receiving and processing low level and high level signals for communicating with analog signal conditioning cards and for transmitting digital control signals, as discussed herein. The control processor 11 is software programmable for processing program code 200 and the feature extraction code 100 all of which store and manipulate sensor 32 originated input data to derive and set stress wave energy measurements, alarm conditions, and control commands. The control processor 11 receives, stores, and extracts friction and shock measurements which originate as structure-borne ultrasound (stress waves) in the machine 50, are converted into electrical signals by the sensor transducers 32, and are conditioned and isolated by the analog signal processor 20 for digital processing. The system of the invention is illustrated, by way of example, with sixteen (16) sensors 32. The instant invention, however, may be customized to a user's particular needs by monitoring selected points on virtually any rotating and reciprocating machinery and programming user-defined condition alarms, threshold levels, and status outputs. Therefore, any number of sensors 32 may be used without departing from the scope and spirit of the instant invention. Although this system accommodates multiple sensor inputs, it is discussed heretofore with respect to one or two sensors since the operation is consistent regardless of the number of inputs.

Figure 9:
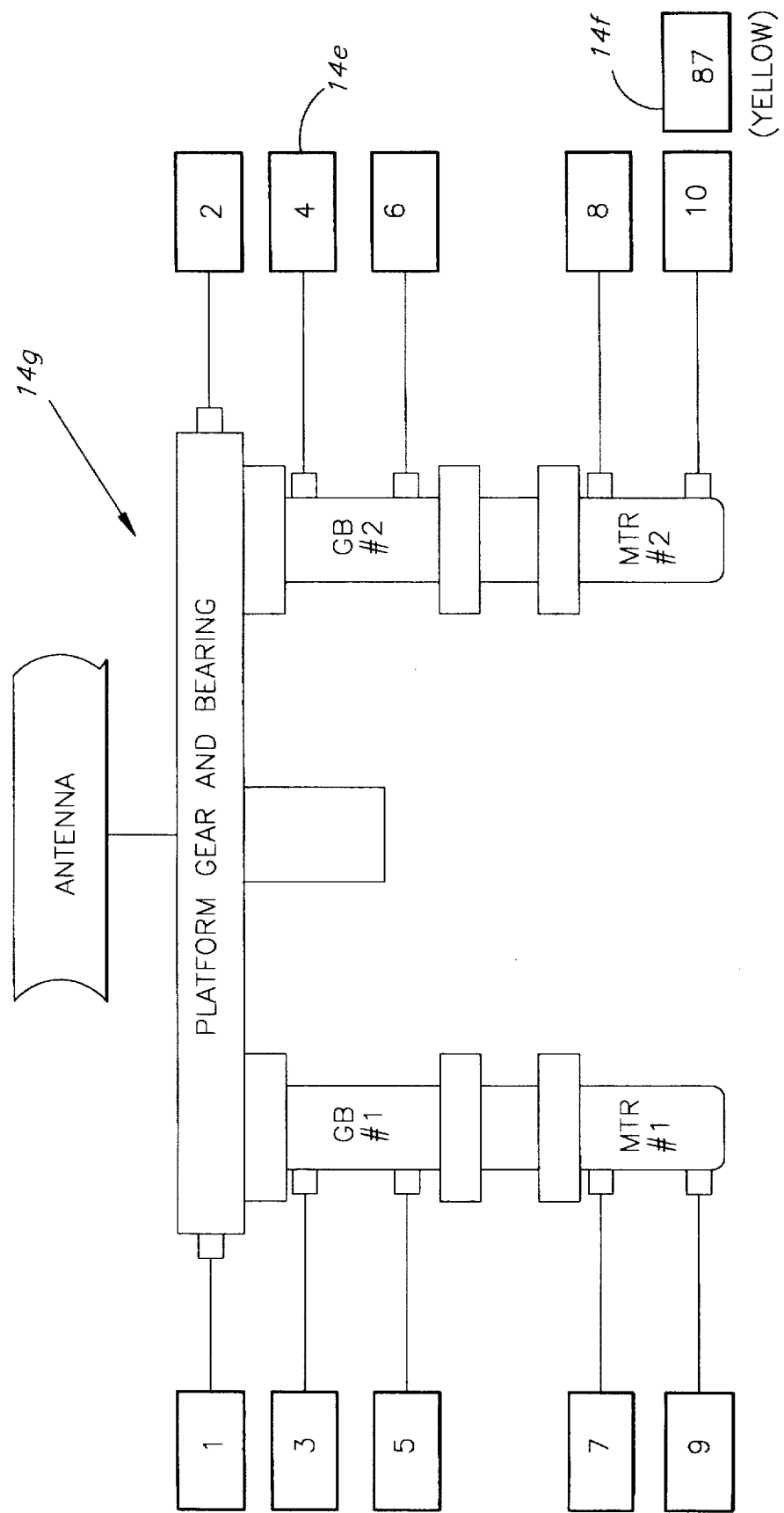
FIG. 9 is an application-specific display example illustrating a fault isolation diagram for an antenna platform gear and bearing system utilizing ten sensor outputs at identified locations.

Stress waves, i.e. friction and shock waves, are preferably detected by specially designed piezoelectric crystal transducer sensors 32 which are firmly mounted onto a machine's structure. However, other vibration, shock and friction sensoring transducers 32 may be employed without departing from the scope and spirit of the invention so long as the outputs are compatible with the hardware of the instant invention as discussed herein. The sensors 32 convert machine motion to electric signals representative of stress wave energy. The crystal sensors 32 are preferably low impedance, high frequency, and high output stress wave sensors having a resonant frequency in operation adequately far from the natural vibration frequency of the machine so as to not be excited by the natural machine frequency. As machine frequencies are typically below 20 khz and stress wave frequencies above 20 khz, a crystal mounted resonant frequency in the 34–40 khz range is preferred so that the crystal is effectively excited at its natural frequency by machine defects rather than machine vibration. The sensors may be attached directly to the machinery by tapped-stud, bolt-on, or epoxy-on pad mounts, as shown in FIGS. 3, 4, and 9.

With reference to FIG. 4, the preferred system 10 of the instant invention generally comprises an analog signal conditioner 20, a digital processor 22, 24, 26, 29, and a control processor 11 (or personal computer), which together electrically communicate with each other and process electrical signals generated by the piezoelectric crystal transducer sensors 32. It should be noted that the listed components of the digital processor 22, 24, 26, 29 may comprise a hybrid of analog and digital components. Stress waves 54 enter the sensor and excite the piezoelectric crystal which converts them into an electrical signal 31. This signal is then amplified and filtered (to remove unwanted sound and vibration components) by the analog signal conditioner 20. The analog signal conditioner 20 generally comprises a series of filter amplifiers for use with a wide range of transducer signal levels, as is known in the art, a high frequency bandpass filter 20a for isolating the stress waves from the systemic machine vibration, and a demodulation circuit (envelope detector) 20b which rectifies the isolated stress waves and generates a stress wave pulse train (SWPT™) to maximize signal information retrieval. The demodulator 20b includes a lowpass filter to perform as an energy discriminator for true envelope detection of the stress wave signal. The output of the analog signal conditioner 20 is an analog pulse train called the Stress Wave Pulse Train (SWPT™). The SWPT™ represents a time history of individual friction and shock events in the monitored machine. The SWPT™ output for the sensors noted above is typically in the DC to 7 khz range. This SWPT™ is then analyzed by the digital processor to determine the peak levels and the stress wave energy (SWE™), i.e., energy content of the detected stress waves.

In further reference to FIG. 4, the digital processor generally includes an analog/digital converter 27 for converting the analog SWPT™ into a digital signal for processing, a counter or integrator 26 for computing stress wave energy, a peak detector 22 (such as a comparitor network) for measuring the peak amplitude of the stress waves, a voltage to frequency convertor 24, and the program manager 11, 200. The program manager provides control and display logic 11, 200, generally shown in FIGS. 14a, 14b and 14c, which comprises processor readable medium of instructions, i.e., system control or operating software, for controlling the display of measurements, making SWE™ computations, processing data, and entering operator selected information, such as alarm thresholds and display formats. The instant invention is compatible with virtually any industry standard personal computer or processor, such as any x86 processor, and operational in a menu-driven environment, including but not limited to Windows® based software or other software (such as that operated on a MacIntosh® or any system).

A more detailed block diagram of the SWAN™ system 10 of the instant invention is illustrated in FIG. 3. With reference to FIG. 3, the analog signal conditioner 20 and digital processor are generally shown on one signal processor card, connected by a stress wave multiplexer card. It should be noted, however, that these cards may be merged into one card or several cards without departing from the scope and spirit of the invention. The stress wave multiplexer card generally comprises a sensor power supply 34, a plurality of sensor inputs 32 (such as sixteen (16) or any number), an analog multiplexer 30 for electrically receiving the sensor inputs, an input status detector (not shown), digital input/output control (DIO control) circuit 28, a speed sensor 38 for monitoring machine speed, and a digital-to-analog (D/A) converter 44 for converting digital SWPT™ time history files to an analog signal for external use. The multiplexer 30 may comprise a 16 input and dual output multiplexer (the number of inputs and outputs may vary without departing from the scope of the instant invention), as shown, for receiving sensor inputs 32 and controlling selected sensor outputs. The sensor power supply 34 comprises a constant current source diode for each sensor. A 24-volt power source is preferably supplied to the constant current source diodes through an interconnect cable. The input status detector may compare voltage to ground for detecting open and short circuits, as previously taught. The speed sensor circuitry 38 monitors signals indicative of machine speed and provides a feedback signal to the control processor 11 for automatically setting ranges. These ranges are used to log data and set gains and limits for alarm readings. The digital input/output control circuit 28 (DIO control) electrically joins the multiplexer 30 to the control processor 11, via the ISA bus control 42, to direct which sensors 32 are to processed and monitored for display. The outputs of the sensors 32, may be automatically scanned or monitored, as selected by the operator and controlled by the program manager 200. Automatic scanning and custom monitoring of the sensors 32 is achieved by sending digital control signals to the multiplexer 30 which selects the sensor outputs. The outputs may be manually selected for display or selected in any predetermined order as programmed by the operator. The stress wave analysis system 10 is based on design assumptions of previously developed stress wave analysis techniques, such as that taught in U.S. Pat. No. 4,530,240, incorporated herein by reference. The stress wave multiplexer system 10 as described above may be tied to and controlled by any particular personal computer platform.

Figure 8:
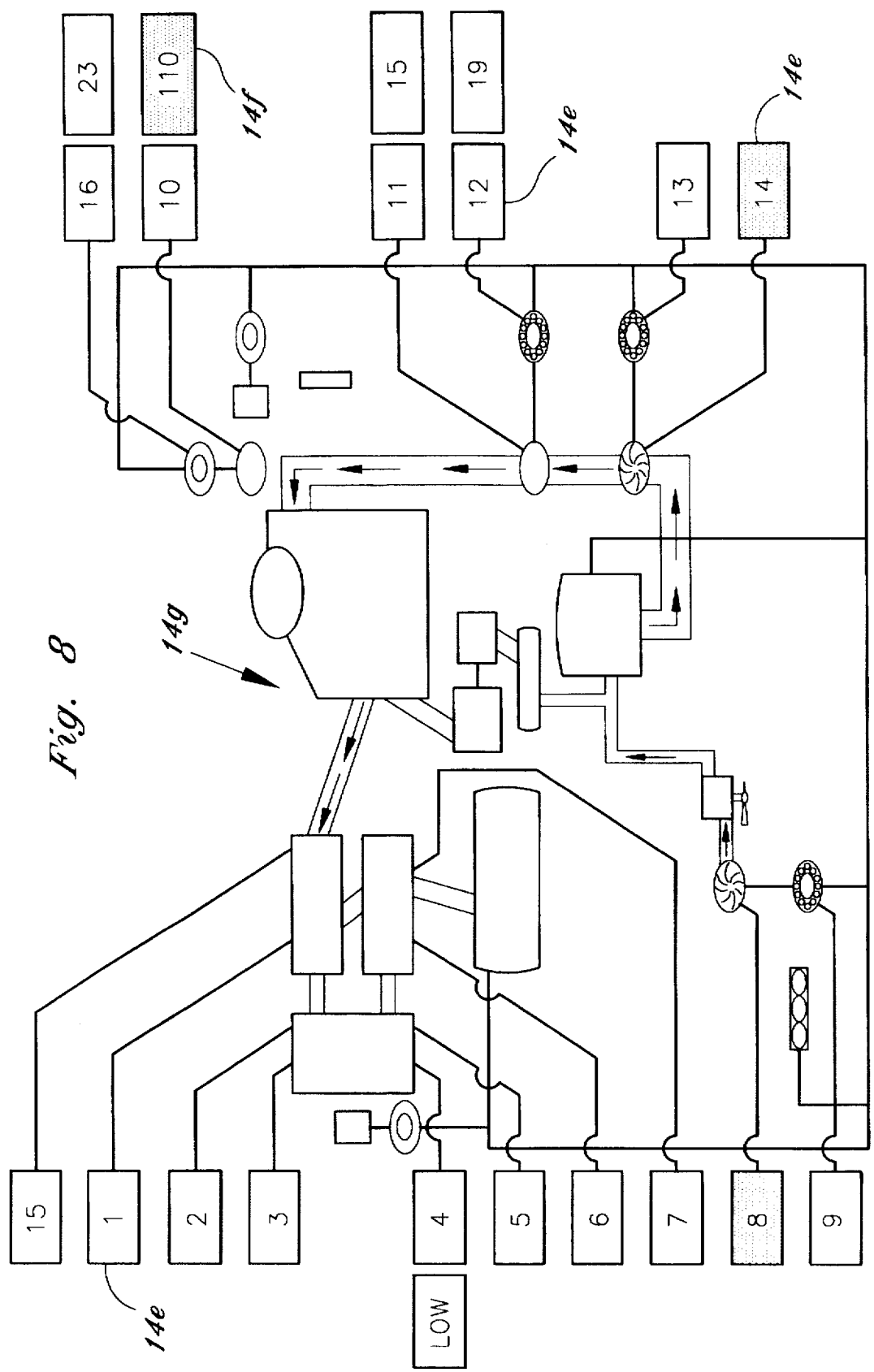
FIG. 8 is an application-specific display example illustrating fault isolation in selected machinery in the sensor attachment and reading points being monitored.

With reference to FIG. 3, the analog filtering circuit and demodulator 10 includes a high frequency bandpass filter to remove machine vibration generated signals for isolating stress waves 31 and demodulating the stress waves to detect stress wave envelopes. The analog filtering and demodulation circuitry 20 is electrically connected to a peak detection/saturation circuitry 22 which includes a comparitor network for indicating the peak amplitude of the stress wave signal levels, the output of which is supplied to the control processor/computer via the PC ISA bus control 42. It should be noted that the PC ISA bus 42 could comprise any compatible or interchangeable bus, including but not limited to a PCMCIA card or VME styled card as used on a Motorolla® controller. A voltage-to-frequency converter 24 produces a frequency output which is applied to a counter 26 for integration under the stress wave envelope. The counter 26 may be associated with a sequencer for integrating the stress wave envelope to provide a time interval integration of the stress wave form. The integration of the stress wave envelope is a measure of the energy of the stress wave, which indicates the severity of a defect. For example, in a spalled bearing, the size and area of the spall 52 would be generally proportionate to the energy measured by the integrator, as pictorially represented in FIG. 5. The output of the counter is supplied to the computer via the PC ISA bus control 42, for processing. The computer 11 logs data into predetermined database according to the speed of the incoming machine speed signals. The display format is software controlled and determined by operator inputs. Application-specific displays for fault isolation are shown in FIGS. 8 and 9.

The computed stress wave energy is displayed on the system's monitor 14 and can be recorded in a database spreadsheet for comparison with other stress wave energy readings. The most useful data is obtained when initial SWE™ readings are taken with no discrepancies in the machinery, to establish a base line SWE $^{TM}$ pattern. From this base line pattern, the operator may program threshold levels, 14a and 14b such as at 500% to 1,000% base line values, to trigger warning alarms. The signal processing elements as shown in FIGS. 3 and 4 are compatible with any industry standard personal computer which may be operated in the Windows® menu-based environment. The program manager 200 provides user interface, graphics, automatic scanning, processing of sensor-related stress wave energy measurements, caution and warning thresholds, user-defined conditions, and selected displays.

Examples of displays appear in FIGS. 6–13. The stress wave envelope is produced as machine parts come in contact with the damage zones. The SWE™ is computed by integrating the envelope. As shown, the area under each pulse (energy content) corresponds to the size of the damage, and the peak amplitude of each pulse is proportional to the depth of the damage.

With reference to the power spectral density plots in FIG. 6, SWE™ readings using the instant invention are compared with vibration measurements and acoustic measurements for an undamaged bearing and a damaged bearing. Comparing the undamaged bearing SWE™ to the damaged bearing SWE™, the signal processing system of the instant invention 10 provides a base line reading for a good bearing and is compared with later measurements. As a tested machine begins to wear, the system 10 can detect and determine the type of damage occurring based on SWE™ plot. An example of this is shown by periodic spikes. By contrast, the vibration and acoustic measurements of the prior art appear unchanged between the good and bad bearings. The SWAN™ signal processing system 10 is able to isolate the damage induced stress waves from the machine vibration, unlike the vibration and acoustic techniques of the prior art.

Figure 1A:
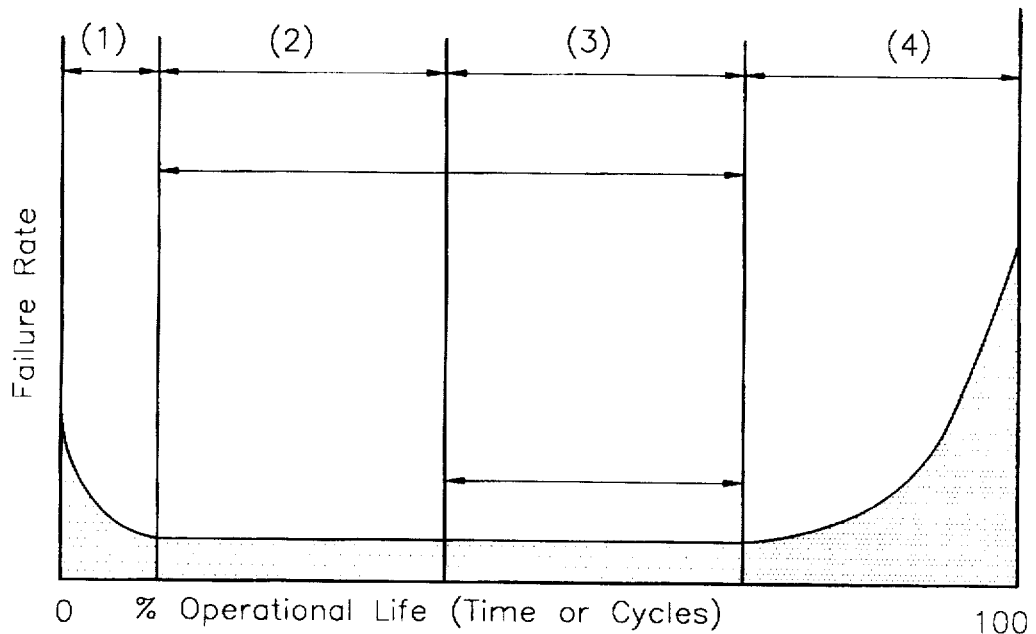
FIG. 1a is a quantitative measure of failure rate changes over operational life stages in rotating and reciprocating machinery.
Figure 1B:
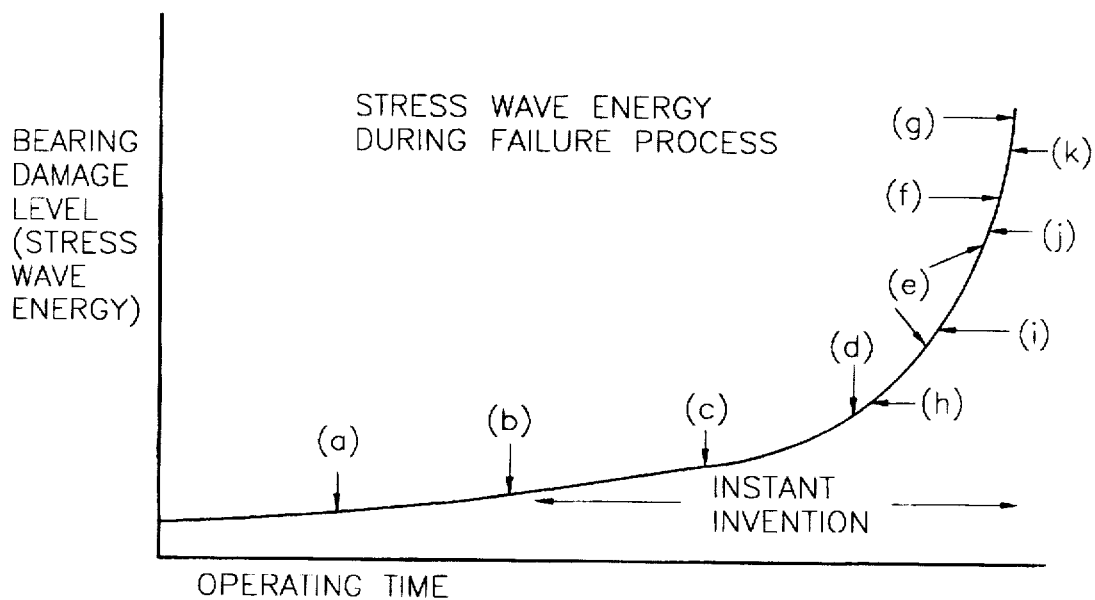
FIG. 1b is a quantitative measure of stress wave energy from a typical bearing during a typical failure process, in rotating or reciprocating machinery having bearings, showing bearing damage level over operating time.
Figure 7:
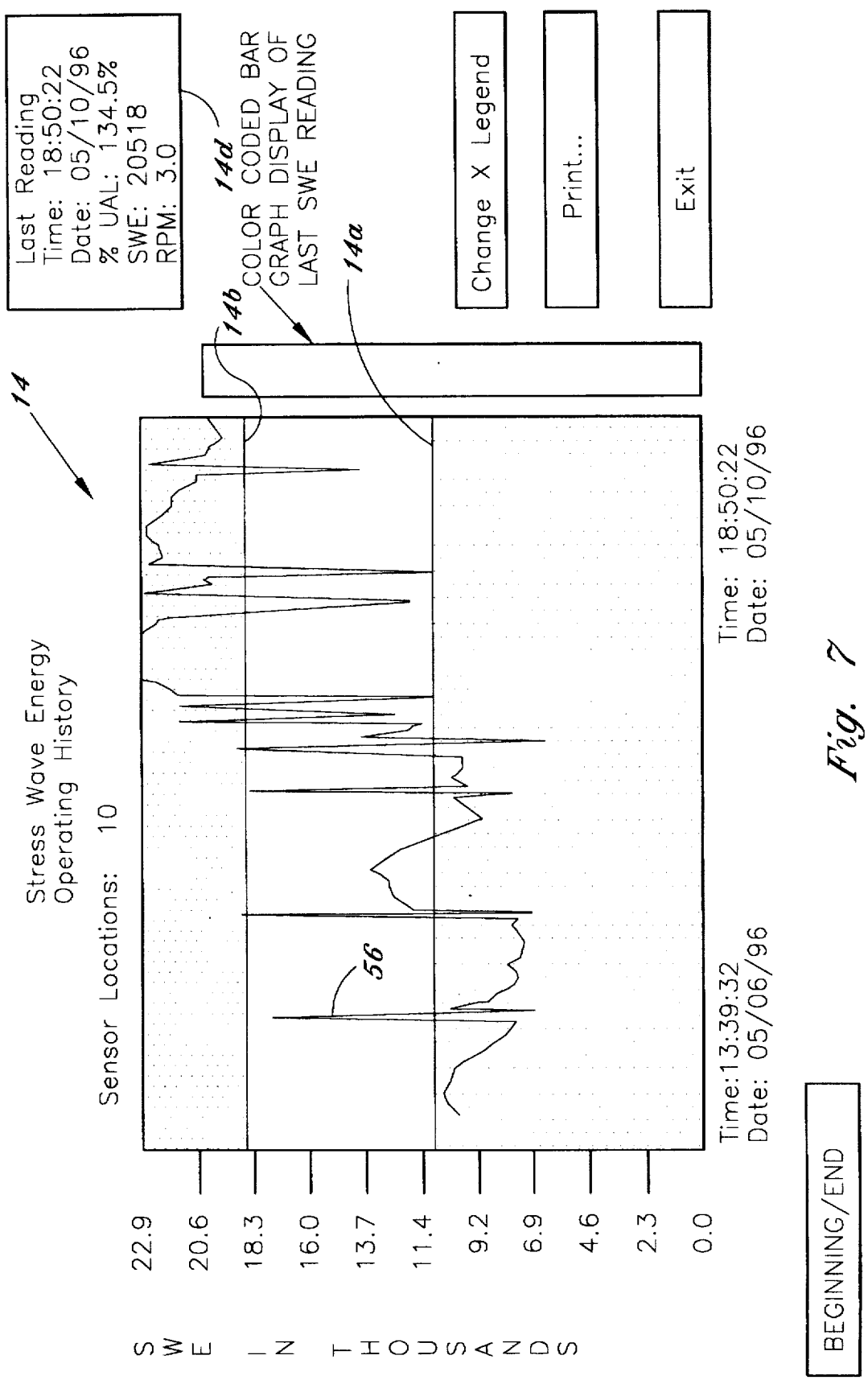
FIG. 7 is an illustration of a sample display for stress wave energy operating history.

The operational software of the instant invention gives the operator the option of displaying the SWE™ operating history for a selected sensor location, as shown in FIG. 7. With reference to FIG. 7, thresholds 14a and 14b are selected by the operator. The upper (warning) threshold 14b is usually set at five (5) to ten (10) times the value of baseline measurements. The lower (caution) threshold 14a is usually set at a level equal to the mean plus three (3) times the standard deviation of a series of baseline measurements. SWE™ measurements below the lower threshold (14a) indicate acceptable damage level early in the failure process. SWE™ readings above the lower threshold 14a and below the upper threshold 14b indicate damage occurring shortly before the wear out stage (4), as shown in FIG. 1a. Once machine damage enters the wear out or replacement stage (4), SWE™ exceeds the upper threshold level 14b. The instant invention may provide colored graphics between each threshold for visually distinguishing the severity of damage. The operator may display similar operating histories for each sensor 32. A separate window, offset from the history chart, displays the time and date, and corresponding SWE™ readings in percentage units (related to the threshold levels) for the last reading in the operating history chart.

With reference to FIGS. 8 and 9, an application-specific display may be used to monitor operator-selected sensors 32 or to automatically scan between predetermined sensors or all the sensors. The rate of scanning is also user-selected and programmed into the operating software. Referring to FIG. 8, sixteen (16) sensors monitor the machinery which is graphically depicted in the display. A similar display may be created for other machinery, as shown in FIG. 9. The sensors 32 are numbered "1" to "16", with the highlighted blocks depicting the currently monitored sensors, "8" and "14". As shown in FIG. 3, the multiplexer accepts sixteen (16) inputs and provides two (2) outputs for processing. The two outputs correspond to the monitored sensors shown. The outside boxes display abnormal SWE™ measurements of previously selected sensors. They are triggered for display once exceeding preselected thresholds. Alternatively, the SWE™ measurement boxes may correspond to the currently monitored sensors. The program may automatically scan through the sensors in any selected order, at any selected rate, or may just monitor operator-selected sensors.

Figure 10A:
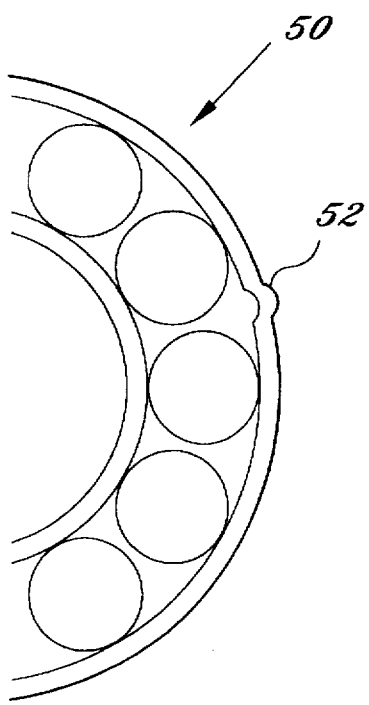
FIG. 10a is a fault isolation stress wave pulse train spectrum for periodic damage events such as that shown.
Figure 10B:
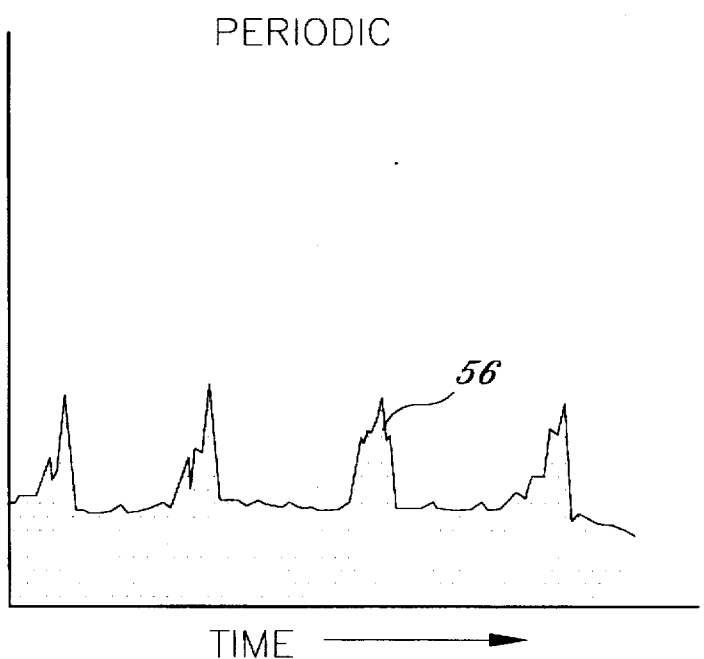
FIG. 10b is a stress wave amplitude histogram for lubrication problems in rotating machinery illustrating aperiodic or random events.
Figure 10C:
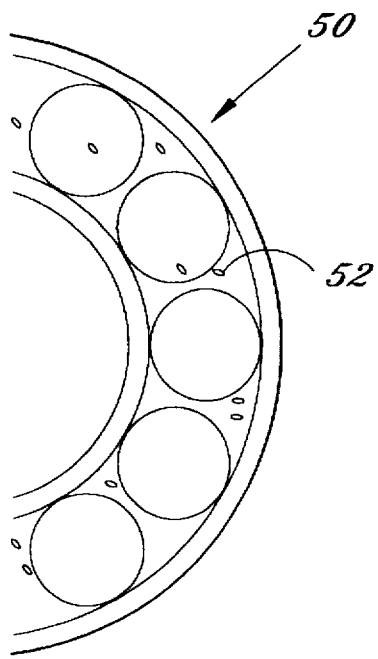
Figure 10D:
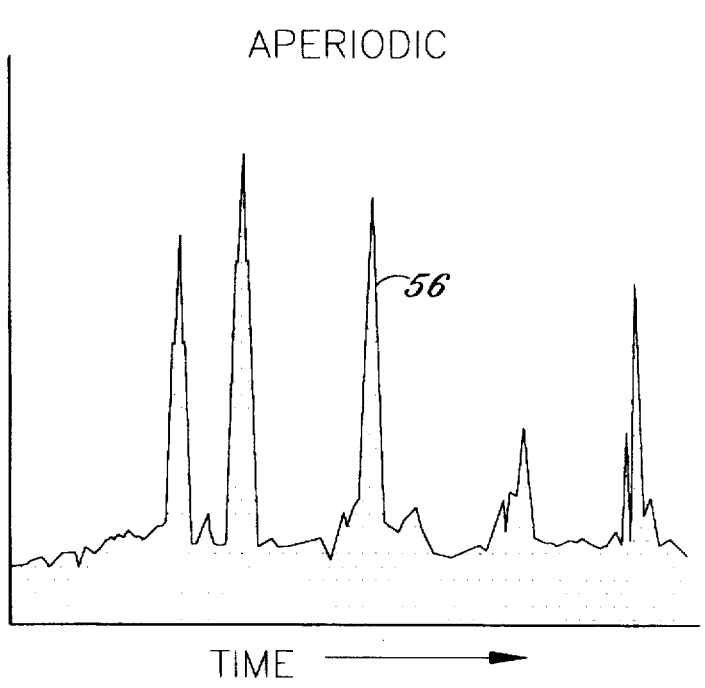

With reference to FIG. 10a and 10b, SWE™ waveforms are shown for isolated damage and random damage both of which are generally referenced by numeral 56. Isolated damage 56 normally occurs at a selected point on the race or rolling element. Such damage may comprise pitting, spalling, or cracking. Random damage typically comprises lubrication contamination resulting from fluids, foreign particles, and metal chips. As shown in FIG. 10a, periodic damage produces spikes 56 uniformly spread out across time. Each spike represents the stress waves produced as the damaged area comes in contact with machine parts in the vicinity of the sensor. With reference to FIG. 10b, random damage 56, such as contaminated lubrication, is more sporadic. Thus, depending on the SWE™ waveform, an operator can determine what kind of damage exists in the machinery.

Figure 11:
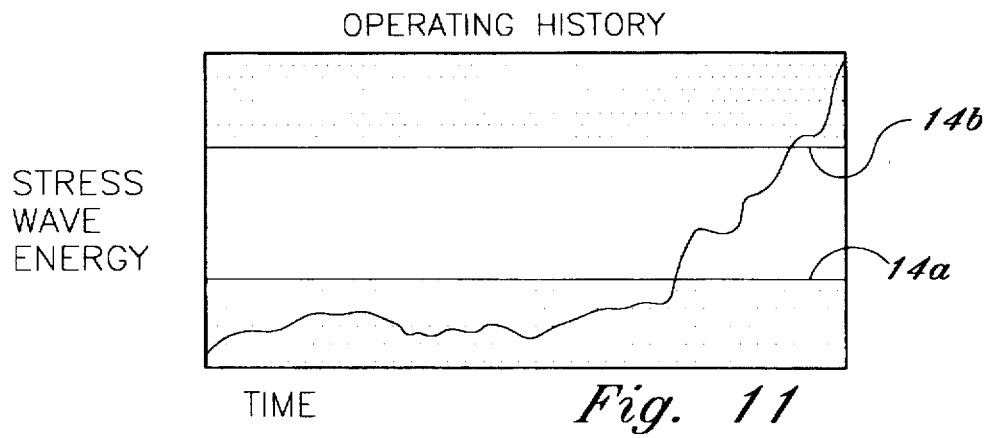
FIG. 11 is an operating history display for fault detection by trend analysis of stress wave energy over time.

With reference to FIG. 11, a stress wave energy operating history is shown. This stress wave energy history corresponds to the discussion in relation to FIG. 7.

Figures 12A, 12B:
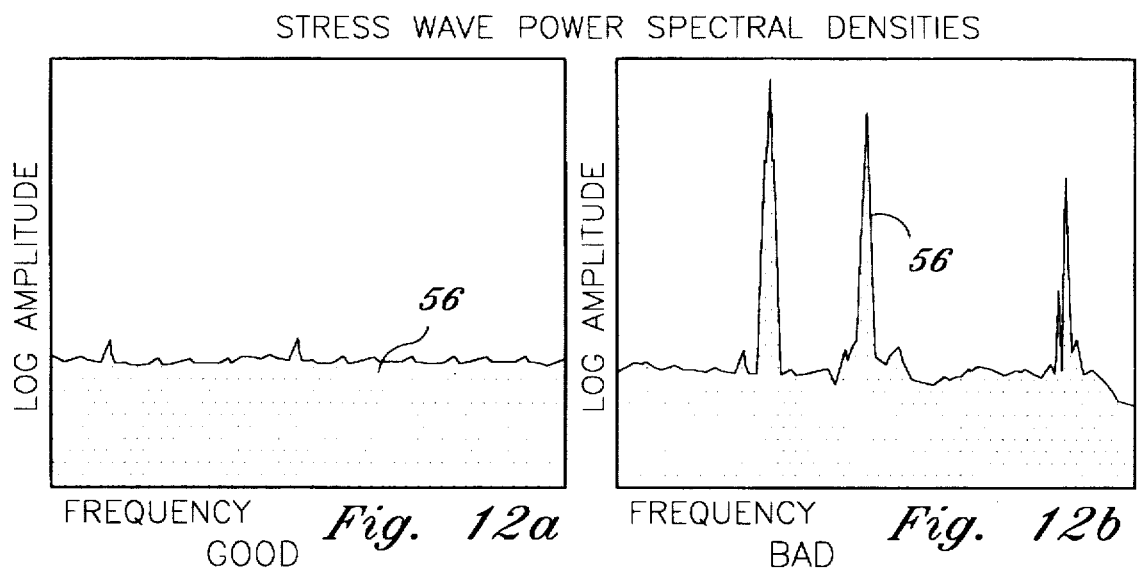
FIG. 12a is a stress wave pulse train spectrum illustrating periodic friction and shock events in a good machine part.
FIG. 12b is a stress wave pulse train spectrum illustrating fault isolation for periodic damage events in a damaged machine part.

The Stress Wave Power Spectral Densities (SWPSD™s) 56, as shown in FIGS. 12a and 12b, show how localized surface damage faults 52 can be isolated to specific machine components, using SWAN™ 10. FIG. 12a is a typical SWPSD™ from a healthy machine. Because all vibrations due to machine structural and rotational dynamics have been filtered out of the SWPT™ signal, the SWPSD™ from any healthy machine will not have any spectral lines that are more than 10db above background SWPT™ levels. When localized surface damage occurs, periodic friction and/or shock pulses are generated which manifest themselves as SWPSD™ spectral lines that are more than 10db above background friction levels (FIG. 12b). The exact frequency of each spectral line is analytically related to the speed and geometry of machine parts, and the location of the damage. Thus, the frequency of the SWPSD™ spectral line allows the analyst to determine the source of abnormal SWE™ levels (FIGS. 7 and 11) and isolate the fault to a particular machine part. Thus, replacement parts can be ordered prior to removing the machine from service, and unscheduled downtime is reduced.

Figures 13A, 13B:
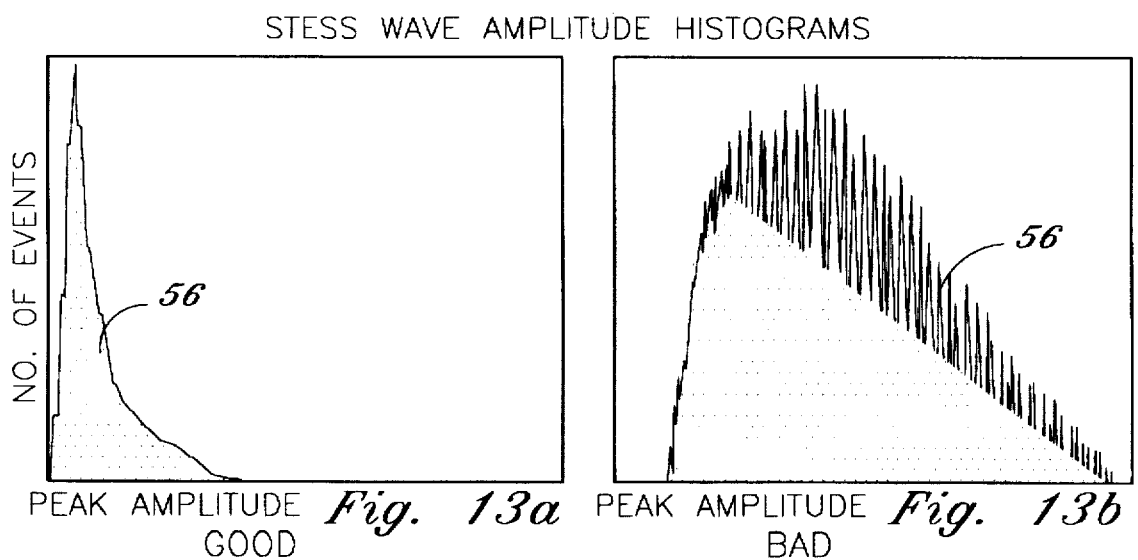
FIG. 13a is a stress wave amplitude histogram for random events in machinery having little to no lubrication problems.
FIG. 13b is a stress wave amplitude histogram for random events illustrating lubrication problems in machinery.

When lubrication problems occur, the abnormal SWE™ levels are due to aperiodic pulses and the SWPSD™ can still appear as in FIG. 12a. The stress wave amplitude histogram (SWAH) (FIG. 13) can be used to verify or detect the presence of lubrication problems. When a healthy lubrication environment exists, the distribution of stress wave peak amplitudes is symmetric, statistically "normal," and at the lower end of the amplitude scale (FIG. 13 (a)). As lubrication problems develop, more and more stress wave pulses with higher peak amplitudes occur. This changes the SWAH shape from a "normal distribution" (FIG. 13a) to a "log normal" or skewed distribution (FIG. 13b). Both the fault isolation stress wave pulse train spectrum in FIGS. 12a and 12b and the stress wave amplitude histogram for lubrication problems are programmed into the operating software of the instant invention. The shape of the stress wave spectrums and histograms assist the operator in determining the type of defect appearing in the machinery.

With reference to FIGS. 14a–14c, the instant invention further comprises essentially two sets of processor readable code of instructions 100, 200, i.e. programmed software stored on a computer or processor useable medium known in the art. One set of instructions 200 comprises the operating/control software, i.e., the program manager, for receiving and processing information received by the digital processor, speed sensor, voltage to frequency converter, peak detection/saturation circuitry, and counter to control stress wave related displays as discussed above and shown in FIGS. 14b–14c. The second set of instructions 100, as shown in FIGS. 14a, comprises feature extraction software used in extracting information from the stress wave pulse train (SWPT™), and other transducer related information as discussed hereto. The extracted features of the SWPT™ can be used as "stand alone" indicators of machine condition, or employed as inputs to artificial intelligence (AI) software such as "Expert Systems" and "Artificial Neural Networks."

The program manager 200 and feature extraction software 100, shown in FIGS. 14a–14c are individually and collectively products of the instant invention and intended to be compatible with all moving part machinery. The control and display logic of the program manager 200 generally allows the system 10 to automatically scan sensor generated stress wave readings 54 (1–16) on the display 14 (as seen in FIG. 8), store data, set user-defined thresholds and condition alarms, isolate sensors 32 for real-time custom monitoring, and view machine fault progression over a selected period of time. The computed SWE™ is digitally displayed by the control processor 11 on the system display monitor 14, so that it can be recorded and/or printed for comparison with identical machines, or for trending over a period of time. It has been determined that when the SWE™ increases five to ten times its normal value, it signifies a distressed operating condition and possible impending failure. The feature extraction software 100 extracts the stress wave calculations shown in FIG. 14a(4). The program manager 200 and feature extraction software 100 are disclosed more fully herein.

PROGRAM MANAGER 200:

Referring to FIGS. 14b(1)–14b(8) and FIGS. 14c(1)–14c (2), the program manager 200 provides the operating control software which comprises the main executive software control 200 and includes digital processor software and speed sensor software. The digital processor software operates the digital processor 22, 24, 26, 29 and includes code instructions for user interface 201, performing a system self-test 202, hardware input/output interface 203, peak detection input/output interface 204, data storage and retrieval 205, and counter-to-control stress wave input/output control 206. The user interface routine 201 communicates with the computer 11 and display 14 via the PC ISA bus control 42. Communication between the operating control software 200 and the hardware of the invention 10 is done through the PC ISA bus control 42. The hardware input/output system interface routine 203 communicates with the DIO control 28, the A/D 27, the analog filter and demodulation circuit 20, and voltage-to-frequency converter 24. The peak detection input/output routine 204 communicates with the peak detection/detection saturation circuit 22. The counter-to-control stress wave input/output routine 206 communicates with the counter and bus control 42.

With reference to FIG. 14b(2), the executive control software 200 includes a series of steps for selecting a valid channel. First, a valid channel is selected 212 and checked for a short or open circuit 214. If the channel is available, then the next valid sensor is selected 218, the current sensor gain is set 220, and the current sensor frame length 222 is set. Referring to FIG. 14b(3), the user interface subsystem software process 201 displays introductory information 230, provides a main display 232, updates menus and displays per user inputs 234, warns the user of preset condition occurrences 236, exits when requested 238, and continues processing 239.

With reference to FIG. 14b(4), the counter-to-control stress wave input/output subsystem software process 206 first decides whether the frame length has expired 240. If the frame length expires, then saturation conditions are checked 241. A routine 206 then obtains the SWE™ count and adjusts for calibration factors 242. When checking sensor limits 243, the conditional branch limit and transient capture limit are checked to see if they exceed predetermined levels 246, 244, respectively. If the conditional branch limit is exceeded 246, then a conditional branch user script is performed 247, and if the transient capture limit is exceeded 244, then a transient capture is performed 245. In either event, the software proceeds to the next step and stores the collected data using the data storage subsystem 205 and releases the channel 249.

Referring to FIG. 14b(5), the self-test subsystem software process 202 processes all valid gains on all channels and reads results with no input 252. The self-test routine 202 then determines whether the reading is within expected range 254. If not, then it fails the self-test and allows the user to quit the self-test. If the reading is within the expected range, then it passes and returns to processing 258. Referring to FIG. 14b(6), the data storage subsystem software stores and retrieves data and limits in a standard database format 260, 262. With reference to FIG. 14b(7), the hardware input/output subsystem software process 203 sets gain and frame length and obtains result data when requested, and continues processing 270-274. With reference to FIG. 14b (8), the peak detection subsystem software process reads peak amplitude value as held by the hardware latch 280. The routine 204 then determines whether the peak amplitude is within an expected range 282. If not, it loops back and takes another amplitude reading. If the peak amplitude is within the expected range, the routine resets the peak amplitude hardware 284 and returns processing.

Referring to FIGS. 14c(1) and 14c(2), the speed sensor software 290 generally senses ticks per revolution 291 from a speed sensor and calculates the RPMs 292 therefrom. Referring to FIG. 14c(2), it sets up control circuitry for receiving sensor outputs 291, counts the ticks per revolution, and converts the event to RPM circuitry 292, sets up control circuitry for receiving inputs 293, and stops any counter updates for RPM counter circuitry 294. The four bytes comprising the RPM counts are then processed 295-297. The speed sensor software 290 then determines whether the RPM count is greater than zero. If the RPM count is above zero, then the calculated RPM is returned to the control software. Otherwise, a default value is returned to the control software 299b, 299a, respectively.

FEATURE EXTRACTION 100:

With respect to the feature extraction (FE) software 100, regardless of the power of AI software, its accuracy and compactness will be dramatically affected by the quality of the input data. Thus, feature extraction software is implemented and is unique to the interpretation of the Stress Wave Pulse Train™ (SWPT™) for the quantitative analysis of friction and shock events in operating machinery. A sample glossary of feature extraction computations and other value and time units derived and used, respectively, by the feature extraction software 100 is shown in FIG. 14a (4).

Feature extraction starts with a time series of values representing the instantaneous amplitudes of the SWPT™ over a predetermined period, such as a ten (10) second period for purposes of illustration. Mathematical transforms are then applied to the time series data for characterization of waveform features such as pulse amplitude, duration, and energy content.

The SWPT™ feature extraction software is shown in FIGS. 14a(1)–14a(4). A general overview of the SWPT™ feature extraction software 100 is shown in FIG. 14a(1). The feature extraction software 100 generally manipulates a limit threshold factor, an SWPT™ input file, and the window length. Referring to FIG. 14a(2), feature extraction software 100 first initializes memory and variables, validates input parameters, calculates the number of sample "windows," and reads the input file "record" into memory 102. As shown in block 104, the "record" is then scanned and data is normalized to zero instead of 2048. The software 100 then converts to stress wave amplitude (4.88 millivolts per unit) and finds the ten smallest values for limit threshold calculation 104. The limit threshold is then calculated by averaging the ten smallest values in the record and multiplying by the limit threshold factor 106. The software 100 then scans all windows, detects and accumulates the number of peaks and peak amplitudes, and detects the recorded maximum and minimum stress wave amplitude values 108. All windows are then scanned again for each peak in each window to calculate peak duration, peak amplitude, and peak energy (sum of values above the limit threshold) 110. The software 100 then accumulates squares and cubes of peak amplitudes above the record mean (for later statistical calculations) and calculates the peak energy factor 110. With reference to FIG. 14a(4), all windows are then scanned to accumulate the full stress wave energy, stress wave peak energy, number of peaks, maximum stress wave peak amplitude, mean duration, and mean PEF 112. The maximum and minimum stress wave peak energy, stress wave energy, PEF, peaks and stress wave peak durations are determined 112. The software 100 next calculates window means for the stress wave peak energy, stress wave energy, PEF, peaks, and stress wave peak duration 114. In the next step, the software calculates the record third moment and standard deviation for stress wave peak energy, stress wave energy, peak energy factor, peaks and stress wave peak duration. This record is then written to the output file 118.

Time Domain Feature Extraction (TDFE) extracts features from the SWPT™ data files generated by the system as noted above and herein. It should be noted that the foregoing numbers may vary without departing from the scope and spirit of the invention. First, the SWPT™ analog signal is sampled thousands (e.g. 15,000) of times per second (but can be sampled up to 30,000 times per second). In this example, each sample preferably has a twelve (12) bit resolution and therefore requires 2 bytes per sample. The total time duration of a SWPT™ time history file is variable, such as in 0.5 second increments from 0.5 seconds to 511 seconds, but the maximum file size is limited to 500 K bytes (in binary format). The data files created may be taken at a 15K sample rate for a duration of ten (10) seconds. These files are then written in binary format (240K), and a subroutine converts each file to ASCII (728K).

Time & Amplitude Standards & Conversions (TDFE) are also computed as amplitude parameters which are entered/ expressed in millivolts. The amplitudes in the SWPT™ files are in volts. The binary range 0–4095 represents +/−10 volts, but the SWPT™ is essentially 0–5 volts. This means that the files contain binary values from 2048 to 4095 with a conversion of 0.00488 volts/binary unit (4.88 millivolts/ binary unit).

All time periods (windows, pulse durations, etc.) are expressed in milliseconds. The SWPT™ analog signal may be sampled 15,000 times per second. For conversions from data point(s) to time, the default sampling rate may be 15K, but provisions can also be made for rates from 100 to 30,000 samples/second.

The following discussion refers to how Time Domain features of the SWPT™ are calculated. A window "W" is first selected, i.e. a user defined number of data points (typically selected as the period corresponding to a characteristic machine frequency). The length of the window is constant for the full data record, but is settable by the operator (default value=0.010 seconds=150 data points). A record is then selected which is typically a maximum of 10 seconds of data (at a 15,000 sample rate, this is 150,000 data points). The data record length "R" is the total time duration represented by the data file, after truncation of any fractional last window. The SWPT™ features fall into three time classes:

1. Peak Duration
2. Window Length
3. Record Length

1. Peak Duration Features

All but two of the features to be extracted from the SWPT™ depend upon the exceedance of a limit threshold "L." This limit is calculated for each window as a multiple of the mean of the ten (10) lowest positive values of the instantaneous amplitude "A" of the SWPT™ during the window. The Limit Threshold Factor (LTF) for computing L is constant for the full record length, but is settable by the analyst (default value=3).

The Stress Wave Peak Duration (SWPD) is the period of time between an upward exceedance of the threshold L and when the A next falls below L. It can also be expressed as the period of time during which sequential values of A remain above L. The Stress Wave Peak Amplitude (SWPA) is the maximum value of A during the SWPD. The Stress Wave Peak Energy (SWPE) is the sum of (A–L) for each data point during the SWPD. Peak Amplitude to Duration Ratio (PADR) is equal to the SWPA divided by the SWPD. Note that the above four features are unique to, and must be computed for each peak in the SWPT™.

2. Window Length Features

The following represents the Window Length Features. Stress Wave Peak Energy per Window (SWPE/W) is the sum of all the individual SWPE values within a window. The Peaks per Window (PEAKS/W) is the total number of SWPT™ peaks that occur during a window. Also equal to the number of computed SWPA values during a window. Stress Wave Peak Duration per Window (SWPD/W) is the sum of all the computed SWPD values during a window. Stress Wave Energy per Window (SWE/W) is the numeric sum of all the A values (greater than zero) for data points that occur during a window. Peak Energy Factor per Window (PEF/W) is the ratio of the SWPE/W to the SWE/W. Note that the above five features are unique to, and must be computed for each window in the SWPT™ record.

3. Record Length Features

The following represents the Record Length Features. Stress Wave Energy per Record (SWE/R) is the numeric sum of all the A values greater than zero for all data points that occur during all windows of a data record. Also the sum of all the calculated SWE/W values in the record. Stress Wave Peak Energy per Record (SWPE/R) is the sum of all the individual SWPE values within a record. Also the sum of all the calculated SWPE/W values in the record. Peak Energy Factor per Record (PEF/R) is the ratio of the SWPE/R to the SWE/R. Peaks per Record (PEAKS/R) is the total number of SWPT™ peaks that occur during a record, which are also equal to the number of computed SWPA values during a record, or the sum of all the computed PEAKS/W values for all the windows in the record. Finally, Stress Wave Peak Amplitude per Record (SWPA/R) is the maximum A value during the record. Also the maximum computed SWPA in all the windows of the record.

The Time Domain Feature Extraction is accomplished as follows, by a "C" subroutine:

1. Raw Binary data (from a System 3000 Transient Capture file) is processed to calculate the 5 "Peak Duration" features (SWPA, SWPD, SWPE, PADR, and No. of Peaks).
2. 5 Window Duration features (SWPE/W, PEAKS/W, SWPD/W, SWE/W, and PEF/W) are calculated from Peak Duration features and window length.
3. 5 Record Length features (SWE/R, SWPE/R, PEF/R, SWPA/R, and PEAKS/R) are calculated from Window Duration features and Record length. The SWPA/R is calculated as the maximum value of the SWPA feature during the entire period.
4. 4 Statistical Parameters (S1, S2, S3, and S4) are calculated for each of the 5 Window Length features, for the full record. These same 4 statistical parameters (describing the Probability Density Distribution) are calculated for all the individual SWPA values in the record. This yields 24 time domain statistical parameters of the SWPT™.
5. The 24 statistical parameters plus the 5 Record Length features are formatted as 29 inputs for the TDFE Data Table which is formatted as a Tab delimited ASCII file.
6. Statistical Parameters (S1, S2, S3, and S4) are defined as follows:
   S1: 3rd Moment test for Normal Distribution.
   S2: Maximum value of the population.
   S3: The ratio of (Maximum-Mean)/(Maximum-Minimum).
   S4: Ratio of the standard deviation of the population to the mean of the population.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A system for predicting failures in rotary and reciprocating machinery including bearings, gears, lubricants, and the like by communicating with a plurality of vibration, shock and friction sensing transducers attached to the machinery, said system comprising:

a signal receiving means for electrically communicating with the plurality of transducers to receive a corresponding number of electrical signals produced by the sensors and corresponding to vibration, friction, and shock waves produced in the machinery during operation;

an analog signal conditioner, in electrical communication with said signal receiving means, comprising means for filtering out signal components from the signals corresponding to vibration and passing only components of the signals corresponding to friction and shock waves and means for detecting envelopes of the signals in said frequency band;

digital processor means, in electrical communication with said analog signal conditioner, for converting analog signals to digital, for computing stress wave energy corresponding to said envelopes and for providing control and display logic to select transducing sensors to be monitored; and control and display means, in electrical communication with said digital processor means, for dictating which transducers to monitor via said control and display logic and for dictating information to be displayed.

2. A system as recited in claim 1, wherein said filtering means includes a band pass filter.

3. A system as recited in claim 1, wherein said sensors comprise non-linear stress wave sensors that resonate above 10 khz.

4. A system as recited in claim 1, wherein said control and display means comprises:

a control processor means for reading and processing a medium of instruction code and a display means for displaying control processor selected information, said control processor means being in electrical communication with said digital processor means, and said display means, for selecting the signals to be processed by said digital processor means, for processing said stress wave energy computation and for controlling the display of said stress wave energy computation, respectively.

5. A system as recited in claim 4, wherein said signal receiving means comprises:

a multiplexer, in electrical communication with the transducers and said analog signal conditioner, for receiving the electrical signals from the transducers and transmitting at least one preselected signal, each said preselected signal being determined by said processor means.

6. A system as recited in claim 4, wherein said analog signal conditioner comprises:

a filtering means, in electrical communication with said multiplexer, for filtering frequencies in each said preselected signal corresponding to the friction and shock waves to arrive at a resultant signal for each said signal, said resultant signal being in a predetermined frequency range corresponding to said transducers.

7. A system as recited in claim 6, wherein said envelope detecting means comprises:

a demodulator means, in electrical communication with said digital processor means, for detecting envelopes in each said preselected signal and for producing a stress wave pulse train, said stress wave pulse trains being processed by said digital processor means for computing the stress wave energy.

8. A system as recited in claim 7, wherein said digital processor means comprises:

an integrator means, in electrical communication with said control processor means, for integrating said stress wave pulse trains to arrive at said stress wave energy computation.

9. A system as recited in claim 8, wherein said digital processor further means comprises:

a peak detection means, in electrical communication with said control processor means, for measuring peak amplitude levels of said stress wave pulse trains.

10. A system as recited in claim 4, wherein said medium of instruction code comprises:

means for selecting said transducers for digital processing by said digital processor means.

11. A system as recited in claim 10 wherein said sensor selecting means further comprises:

a scanning means for selectively scanning through said transducers to be selected for digital processing by said digital processor means.

12. A system as recited in claim 10, wherein said medium of instruction code comprises:

means for computing stress wave energy measurements in said signals generated by said transducers.

13. A system for predicting failures in rotary and reciprocating machinery including bearings, gears, lubricants, and the like by communicating with a plurality of vibration, shock and friction sensing transducers attached to the machinery, said system comprising:

a signal receiving means for electrically communicating with the plurality of transducers to receive a corresponding number of electrical signals produced by the sensors and corresponding to vibration, friction, and shock waves produced in the machinery during operation;

an analog signal conditioner, in electrical communication with said signal receiving means, comprising means for filtering out signal components from the signals corresponding to vibration and passing only components of the signals corresponding to friction and shock waves and means for detecting envelopes of the signals in said frequency band;

digital processor means, in electrical communication with said analog signal conditioner, for converting analog signals to digital, for computing stress wave energy corresponding to said envelopes and for providing control and display logic to select transducing sensors to be monitored;

control and display means, in electrical communication with said digital processor means, for dictating which transducers to monitor via said control and display logic and for dictating information to be displayed; and means for creating a histogram of said stress wave energy measurements over a selected period of time.

14. A system for predicting failures in rotary and reciprocating machinery, including bearings, gears, lubricants, and the like, said system comprising:

a plurality of stress wave sensor transducers for attachment to the machinery at selected points to produce a corresponding number of electrical signals corresponding to vibration, friction, and shock waves produced in the machinery during operation;

multiplexing means, in electrical communication with said transducers, for receiving said electrical signals from said transducers and transmitting at least one selected signal corresponding to at least one preselected transducer;

filtering means, in electrical communication with said multiplexing means, for filtering out frequencies corresponding to vibration and passing only friction and shock waves, said filtering means deriving a resultant signal for each said preselected signal, said resultant signal being in a predetermined frequency range corresponding to said transducers;

digital processor means, in electrical communication with said filtering means, for converting analog signals to digital, for computing stress wave energy corresponding to said envelopes and for providing control and display logic to select transducers to be monitored; and control processing means, in electrical communication with said multiplexing means and said digital processing means for selecting said at least one selected signal, for communicating with said transducers and for displaying friction and shock wave energy measurements and envelope measurements.

15. A system as recited in claim 14, wherein said filtering means includes a band pass filter.

16. A system as recited in claim 14, wherein said sensors comprise non-linear stress wave sensors that resonate above 10 khz.

17. A system as recited in claim 14, wherein said control processing means comprises:

code means for reading and processing a medium of instruction code and a display means for displaying control processor selected information, said code means being in electrical communication with said display means, said control processing means processing said code means for selecting said signals to be processed by said digital processor means, for processing said stress wave energy computation and for controlling the display of said stress wave energy computation, respectively.

18. A system as recited in claim 17, further comprising:

a demodulator means, in electrical communication with said filtering means and said digital processor means, for producing a stress wave pulse train, said stress wave pulse trains being processed by said digital processor means for computing the stress wave energy.

19. A system as recited in claim 18, wherein said digital processor means comprises:

an integrator means, in electrical communication with said control processor means, for integrating said stress wave pulse trains to arrive at said stress wave energy computation.

20. A system as recited in claim 19, wherein said digital processor means further comprises:

a peak detection means, in electrical communication with said control processing means, for measuring peak amplitude levels of said stress wave pulse trains.

21. A system as recited in claim 20, wherein said plurality of transducers comprise piezoelectric crystal transducer sensors.

22. A system as recited in claim 17, wherein said medium of instruction code comprises:

means for selecting said transducers for digital processing by said digital processor means.

23. A system as recited in claim 22, wherein said transducer selecting means further comprises:

a scanning means for selectively scanning through said transducers to be selected for digital processing by said digital processor means.

24. A system as recited in claim 23, wherein said medium of instruction code comprises:

means for computing stress wave energy measurements in said signals generated by said transducers.

25. A system for predicting failures in rotary and reciprocating machinery, including bearings, gears, lubricants, and the like, said system comprising:

a plurality of stress wave sensor transducers for attachment to the machinery at selected points to produce a corresponding number of electrical signals corresponding to vibration, friction, and shock waves produced in the machinery during operation;

multiplexing means, in electrical communication with said transducers, for receiving said electrical signals from said transducers and transmitting at least one selected signal corresponding to at least one preselected transducer;

filtering means, in electrical communication with said multiplexing means, for filtering out frequencies corresponding to vibration and passing only friction and shock waves, said filtering means deriving a resultant signal for each said preselected signal, said resultant signal being in a predetermined frequency range corresponding to said transducers;

digital processor means, in electrical communication with said filtering means, for converting analog signals to digital, for computing stress wave energy corresponding to said envelopes and for providing control and display logic to select transducers to be monitored;

control processing means, in electrical communication with said multiplexing means and said digital processing means for selecting said at least one selected signal, for communicating with said transducers and for displaying friction and shock wave energy measurements and envelope measurements; and means for creating a histogram of said stress wave energy measurements over a selected period of time.

26. A system for predicting failures in rotary and reciprocating machinery by receiving and processing electrical signals produced by a plurality of motion sensing transducers and indicative of vibration, friction and shock waves, said signals corresponding to vibration, friction, and shock waves produced in the machinery during operation, said machinery, including bearings, gears, lubricants, and the like, said system comprising:

multiplexing means, in electrical communication with said transducers, for receiving said electrical signals from said transducers and transmitting at least one selected signal corresponding to at least one preselected transducer;

filtering means, in electrical communication with said multiplexing means, for filtering out frequencies corresponding to vibration and passing only frequencies corresponding to friction and shock waves, said filtering means deriving a resultant signal for each said preselected signal, said resultant signal being in a predetermined frequency range corresponding to said transducers;

digital processor means, in electrical communication with said filtering means, for converting analog signals to digital, for computing stress wave energy corresponding to said envelopes and for providing control and display logic to select transducers to be monitored; and control processing means, in electrical communication with said multiplexing means and said digital processing means for selecting said at least one selected signal, for communicating with said transducers and for displaying friction and shock wave energy measurements and envelope measurements.

27. A system as recited in claim 26, wherein said filtering means includes a band pass filter.

28. A system as recited in claim 26, wherein said sensors comprise non-linear stress wave sensors that resonate above 10 khz.

29. A system as recited in claim 26, wherein said control processing means comprises:

code means for reading and processing a medium of instruction code and a display means for displaying control processor selected information, said code means being in electrical communication with said display means, said control processing means processing said code means for selecting said signals to be processed by said digital processor means, for processing said stress wave energy computation and for controlling the display of said stress wave energy computation, respectively.

30. A system as recited in claim 29, further comprising:

a demodulator means, in electrical communication with said filtering means and said digital processor means, for producing a stress wave pulse train, said stress wave pulse trains being processed by said digital processor means for computing the stress wave energy.

31. A system as recited in claim 30, wherein said digital processor means comprises:

an integrator means, in electrical communication with said control processor means, for integrating said stress wave pulse trains to arrive at said stress wave energy computation.

32. A system as recited in claim 31, wherein said digital processor further means comprises:

a peak detection means, in electrical communication with said control processing means, for measuring peak amplitude levels of said stress wave pulse trains.

33. A system as recited in claim 32, wherein said medium of instruction code comprises:

means for selecting said transducers for digital processing by said digital processor means.

34. A system as recited in claim 33, wherein said sensor selecting means further comprises:

a scanning means for selectively scanning through said transducers to be selected for digital processing by said digital processor means.

35. A system as recited in claim 34, wherein said medium of instruction code comprises:

means for computing stress wave energy measurements in said signals generated by said transducers.

36. A system for predicting failures in rotary and reciprocating machinery by receiving and processing electrical signals produced by a plurality of motion sensing transducers and indicative of vibration, friction and shock waves, said signals corresponding to vibration, friction, and shock waves produced in the machinery during operation, said machinery, including bearings, gears, lubricants, and the like, said system comprising:

multiplexing means, in electrical communication with said transducers, for receiving said electrical signals from said transducers and transmitting at least one selected signal corresponding to at least one preselected transducer;

filtering means, in electrical communication with said multiplexing means, for filtering out frequencies corresponding to vibration and passing only frequencies corresponding to friction and shock waves, said filtering means deriving a resultant signal for each said preselected signal, said resultant signal being in a predetermined frequency range corresponding to said transducers;

digital processor means, in electrical communication with said filtering means, for converting analog signals to digital, for computing stress wave energy corresponding to said envelopes and for providing control and display logic to select transducers to be monitored;

control processing means, in electrical communication with said multiplexing means and said digital processing means for selecting said at least one selected signal, for communicating with said transducers and for displaying friction and shock wave energy measurements and envelope measurements; and means for creating a histogram of said stress wave energy measurements over a selected period of time.

* * * * *